(12) United States Patent
Nogami et al.

(10) Patent No.: US 7,516,656 B2
(45) Date of Patent: Apr. 14, 2009

(54) METHOD AND APPARATUS FOR DIAGNOSING MOTOR-OPERATED VALVE

(75) Inventors: Takeki Nogami, Takamatsu (JP); Shigeya Yamaguchi, Takamatsu (JP)

(73) Assignee: Shikoku Research Institute Incorporated (JP)

( * ) Notice: Subject to any disclaimer, the term of this patent is extended or adjusted under 35 U.S.C. 154(b) by 198 days.

(21) Appl. No.: 10/545,608

(22) PCT Filed: Mar. 10, 2004

(86) PCT No.: PCT/JP2004/003072

§ 371 (c)(1), (2), (4) Date: Aug. 16, 2005

(87) PCT Pub. No.: WO2004/081436

PCT Pub. Date: Sep. 23, 2004

(65) Prior Publication Data

US 2008/0006101 A1    Jan. 10, 2008

(30) Foreign Application Priority Data

Mar. 10, 2003    (JP) .............................. 2003-062804

(51) Int. Cl.
*G01M 19/00*    (2006.01)
(52) U.S. Cl. ....................................................... 73/168
(58) Field of Classification Search .................. 73/168, 73/862.193, 862.27, 862.31
See application file for complete search history.

(56) References Cited

U.S. PATENT DOCUMENTS

| | | | | |
|---|---|---|---|---|
| 4,542,649 A | * | 9/1985 | Charbonneau et al. | ........ 73/168 |
| 4,660,416 A | * | 4/1987 | Charbonneau et al. | ........ 73/168 |
| 4,794,314 A | * | 12/1988 | Janu et al. | .................... 318/685 |
| 4,856,327 A | * | 8/1989 | Branam et al. | ................. 73/168 |
| 5,594,175 A | * | 1/1997 | Lyon et al. | ..................... 73/168 |
| 5,671,635 A | * | 9/1997 | Nadeau et al. | ................ 73/168 |
| 5,836,567 A | * | 11/1998 | Watanabe | ..................... 73/168 |
| 2007/0246669 A1 | * | 10/2007 | Nogami et al. | ......... 251/129.01 |

FOREIGN PATENT DOCUMENTS

WO    WO2006/137169 A1  *  12/2006

* cited by examiner

*Primary Examiner*—Hezron Williams
*Assistant Examiner*—Nashmiya S. Fayyaz
(74) *Attorney, Agent, or Firm*—Bacon & Thomas, PLLC

(57) ABSTRACT

A diagnostic method and apparatus for diagnosing a motor-operated valve capable of continuously measuring a preload of a spring cartridge at low costs, with high accuracy, and with ease, so that the elastic characteristics of the spring cartridge may be easily calibrated in a simple manner. The method and apparatus is for diagnosing a motor-operated valve including a valve disc 25, a worm 12 rotatably driven by motor power, a link mechanism which opens and closes the valve disc 25 with the rotational driving force transmitted from the worm 12, and a spring cartridge 13 containing disc springs 15 which expand or compress in response to reaction force acting on the worm 12 in its axial direction from the link mechanism. The method and apparatus calibrates the torque curve representing the elastic characteristics the spring cartridge 13 based on the load corresponding to a specific compression condition of the spring cartridge 13, and based on the torque curve thus calibrated, produces a diagnosis of the motor-operated valve. Accordingly, an easy and quick diagnosis can be achieved on whether the torque-related characteristics of the motor-operated valve are appropriate or not.

31 Claims, 9 Drawing Sheets

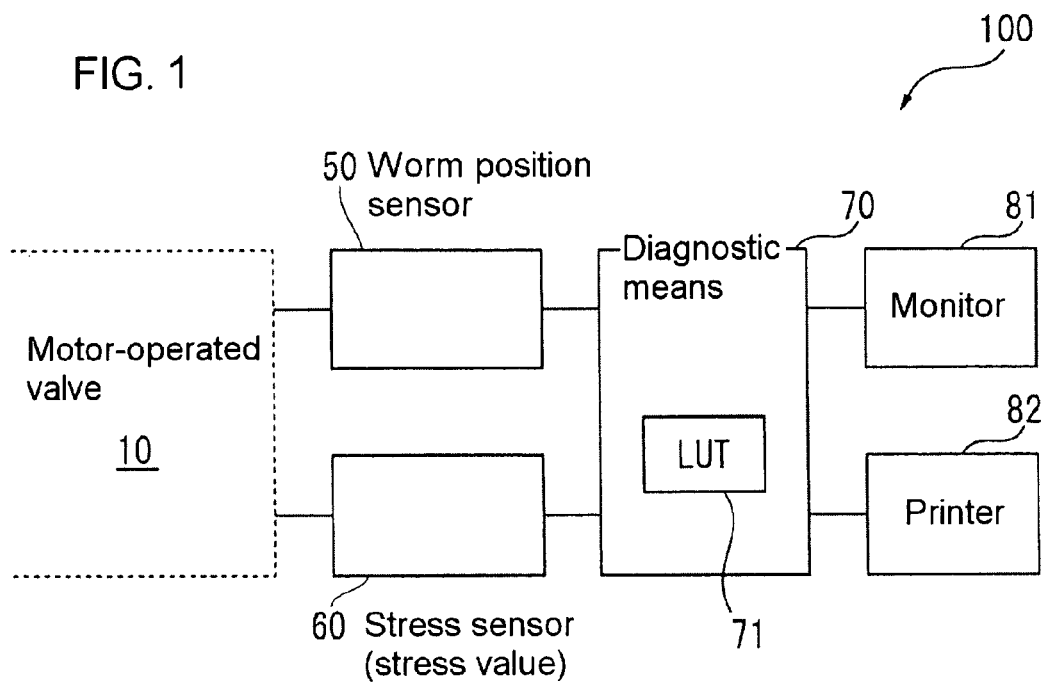

VIEW A

VIEW B

METHOD AND APPARATUS FOR DIAGNOSING MOTOR-OPERATED VALVE

TECHNICAL FIELD

The present invention relates to a method and apparatus for diagnosing a motor-operated valve. More particularly, the invention relates to a method and apparatus which produces a torque-related diagnosis of a motor-operated valve. The diagnosis is produced by detecting a change in the preload of a spring cartridge containing disc springs and determining, based on the result of this detection, the elastic characteristics (torque curve) of the spring cartridge during a time when a motor-operated valve moves from the full open position to the full close position and vice versa.

BACKGROUND ART

Motor-operated valves are being used extensively in a variety of pipes installed in nuclear power plants and other facilities for many years.

A motor-operated valve in such applications comprises: a valve disc for opening and closing a passage in a pipe; a worm rotatably driven by motor power such as an electric motor; a link mechanism (a gear, a drive sleeve, a stem nut, a valve stem, etc.) which opens and closes the valve disc with the rotational driving force transmitted from the worm; and a spring cartridge containing disc springs which expand or compress in response to reaction force acting on the worm in its axial direction from the link mechanism.

The spring cartridge contains disc springs and is provided to prevent the worm from delivering excessive rotational driving force (torque) to the link mechanism. The spring cartridge is also referred to as a "spring pack," "torque spring cartridge," or "torque spring pack."

The spring cartridge comprises a shaft, a plurality of disc springs, and two compression plates. The shaft moves axially together with the worm. The disc springs are fitted around the shaft with the shaft penetrating the center of the disc springs. The compression plates hold the disc springs in the axial direction from both ends. Each of the compression plates is able to slide together with the shaft only in the direction into which the disc springs are compressed. The compression plates hold the disc springs compressed with a predetermined load applied in advance.

This load holding the disc springs pre-compressed is referred to as the "preload" of the spring cartridge.

When a motor or the like is operated to move the valve disc from the open position to the close position, the driving force from the motor rotates the worm and drives the link mechanism, the link mechanism comprising a gear engaging the worm, a drive sleeve, a stem nut, a valve stem, etc. Consequently the valve disc descends and is closed.

Reverse rotation of the worm raises and opens the valve disc.

With the rotation of the worm, the driving force is transmitted to the link mechanism, which in turn drives the valve disc. The valve disc, when closed, contacts a valve seat located in the valve body. When this contact occurs, the valve disc begins to receive reaction force from where it has contacted.

This reaction force is then transmitted to the worm by way of the link mechanism and acts on the worm as a load to displace the worm in its axial direction.

On the other hand, the spring cartridge shaft and one of the compression plates move integrally with the worm. This movement compresses the disc springs fitted around the spring cartridge shaft by the amount which corresponds to the displacement of the compression plate.

However, the spring cartridge urges the worm in its axial direction with the preload. Therefore, the worm will not begin to move until a component of the aforementioned reaction force acting on the worm exceeds the preload. When the reaction force acting on the worm exceeds the preload, the worm is displaced in a direction which compresses the disc springs in the spring cartridge according to the compression force on the spring cartridge.

That is to say, the worm begins to move against the urging force when the preload is exceeded by the reaction force. The reaction force continuously increases until the valve disc reaches a predetermined close position after it contacts the valve seat.

If the valve disc continues to be closed after it reaches the predetermined close position, damage may be caused to the valve disc, the interface between the worm and the link mechanism, or other parts of the valve disc. To prevent this from happening, the rotation of the worm need to be stopped.

Accordingly, a limit switch (a torque switch) is provided at a position to which the worm will move when the valve disc reaches a predetermined close position, so that the motor operation can stop.

This means that the set point for actuating the torque switch provided on the worm is determined by the amount of worm displacement (in the compression direction).

When the Hooke's Law is applied to the spring cartridge, an equation, $F=k \cdot x$, exists. F is a load, k is a spring constant, and x is an amount of compression.

The preload $F0$ of the spring cartridge is then given by $F0=k \cdot x0$, where $x0$ is the amount of pre-compression. This preload $F0$ acts on the worm as an urging force.

Accordingly, an urging force, Fs, acting on the worm when the torque switch is actuated is given by:

$$Fs = F0 + k \cdot xs$$
$$= k \cdot (x0 + xs),$$

where xs is the amount of worm displacement set to actuate the torque switch.

Thus, the actuating point of the torque switch is substantially defined by the load Fs acting on the worm.

However, the aforementioned disc springs in the spring cartridge may experience wear or similar degradation due to ageing or some other causes.

When this happens, the amount of pre-compression, $x0$, on the disc springs decreases by $\Delta x$ corresponding to a reduction in the length caused by wear. In this case, the pre-compression amount $x1$ is given by:

$$x1 = x0 - \Delta x.$$

The preload F1 is given by;

$$F1 = k \cdot x1$$
$$= k \cdot (x0 - \Delta x)$$
$$= F0 - k \cdot \Delta x.$$

As shown, the preload after wear occurred becomes lower than the preload F0 before the wear occurred.

Load Fs' at the actuating point of the torque switch (x=xs) is then expressed by:

$$Fs' = F1 + k \cdot xs$$
$$= (F0 - k \cdot \Delta x) + k \cdot xs$$
$$= Fs - k \cdot \Delta x.$$

As shown, the load Fs' after wear occurred becomes lower than the load Fs before the wear occurred by $\Delta F$ ($=k \cdot \Delta x$).

This can cause the torque switch to be actuated before the valve disc reaches a predetermined close position, or with an excessive margin for a specified allowable strength. This in turn may prevent a motor-operated valve from operating properly in accordance with its characteristics.

The description provided above assumes a valve operation in which the valve disc moves from an open position to a close position. Similar actions and effects apply to a valve operation in which the valve disc moves from a close position to an open position, with a resulting decrease in the load acting on the torque switch.

Consequently, a variety of motor-operated valve diagnostic apparatuses have heretofore been proposed. The proposed apparatuses often determine the torque curve (the section at which the compression amount is zero represents the preload) representing a relation between the load (or torque) acing on the spring cartridge and the compression amount of the spring cartridge (excluding the pre-compression amount), and then, based on the torque curve thus determined, produce a diagnosis on whether or not a motor-operated valve is operating properly.

For measuring torque, one apparatus uses a strain sensor, for example. In such an apparatus, the strain sensor is permanently provided on a motor-operated valve as an integral part of the spring cartridge (built-in torque sensor; an example can be found in International Publication Gazette WO95/14186). The strain sensor is for directly measuring stress (or torque) acting on the compression plate of the spring cartridge from the worm. Another diagnostic apparatus measures torque using a load cell together with a displacement sensor (externally-attached torque sensor; examples can be found in Japanese patent No. 2982090, FIG. 1 and other literature). In this case, a calibrated load cell is mounted on a motor-operated valve from outside its casing, with the use of an adapter placed between the load cell and the motor-operated valve, in a way that the load cell hits the compression plate of the spring cartridge. The displacement sensor is for detecting displacement of the spring cartridge shaft.

The externally-attached torque sensor as described above uses the displacement sensor to detect displacement of the spring cartridge shaft and the load cell to measure stress applied from the compression plate, when the spring cartridge shaft moves toward the load cell to compress the disc springs. From the result of this, the preload and the spring constant are determined. When the shaft moves away from the load cell together with the compression plate located at the shaft end and compresses the disc springs, the displacement of the shaft is detected by the displacement sensor, while the stress is detected using the detected displacement and the spring constant already obtained.

In another diagnostic apparatus, a spring cartridge is taken out of the casing of a motor-operated valve. Measurement is then made on the spring cartridge alone to determine the elastic characteristics thereof. In yet another diagnostic apparatus, a diagnosis of a motor-operated valve is produced based only on the detection of worm displacement.

DISCLOSURE OF THE INVENTION

Problems to be Solved by the Invention

The disadvantage of an externally-attached torque sensor is that a load cell or the like is a large piece of equipment in itself and, therefore, difficult to be mounted on a motor-operated valve on a permanent basis. Thus, a load cell or the like has to be mounted and dismounted from a motor-operated valve at every diagnosis. This means that a great amount of time is required for pre-work and post-work activities.

In addition, the inability to mount an externally-attached torque sensor permanently on a motor-operated valve makes it necessary to stop the operation of the motor-operated valve when the load cell, etc., is mounted on and dismounted from the motor-operated valve, to ensure safety. If the motor-operated valve to be diagnosed is in a large plant such as a nuclear power plant, diagnosis can in effect be performed only during a planned plant outage.

Furthermore, it is not possible, with the use of the existing method which use an externally-attached torque sensor, to directly measure stress acting on the spring cartridge when the disc springs are compressed in a direction in which the spring cartridge shaft moves away from the load cell, i.e., when the valve is opening. Thus, in the existing method heretofore, it has been assumed, for the purpose of convenience, that the elastic characteristics of the spring cartridge during valve opening are the same as those during valve closing. Thus, after the amount of worm displacement is measured during valve opening, the stress for valve closing corresponding to the same displacement amount as this measured amount has been taken as the stress for valve opening.

However, as described, some motor-operated valves develop hysteresis indicating that the elastic characteristics of the spring cartridge during valve closing is different from those during the valve opening depending on how the disc springs stay in the spring cartridge or on other reasons. In such a case, taking the elastic characteristics for the valve closing operation as that for the valve opening operation will reduce accuracy of the diagnosis.

A motor-operated valve diagnostic apparatus using a built-in torque sensor is not free from problems, either. That is, a strain sensor has to be provided to each motor-operated valve, necessitating a large expenditure of money. Besides, to calibrate a strain sensor at regular intervals, it is necessary to remove the spring cartridge from a motor-operated valve. Furthermore, the built-in torque sensor alone cannot directly measure a reduction in the preload caused by wear or similar problems on the disc springs. It is therefore necessary to provide another sensor for detecting the amount of compression applied to the spring cartridge in addition to the built-in torque sensor.

With the use of a motor-operated valve diagnostic apparatus which requires the spring cartridge to be removed from the valve for taking measurement thereon, it is not possible to calibrate the torque curve with the motor-operated valve under actual operating conditions (i.e., with the spring cartridge fit to the casing of the motor-operated valve).

In addition, with the removal of the spring cartridge from the motor-operated valve, the position of the spring cartridge and the shaft relative to the position of the torque switch may move. That is, the interacting condition between these component parts may change. The result is that load acting on the torque switch may change compared to the value before the removal of the spring cartridge.

Apart from the apparatuses discussed above, there is yet another method for diagnosing a motor-operated valve. This method produces a diagnosis after measuring the spring constant. In this method, conversion into a torque is made by referring to a predefined torque curve (a corresponding relation between the torque and the displacement), using a mechanism that rotates as the worm moves in its axial direction. However, with this method, it is not possible to calibrate the torque curve; nor is it possible to directly detect the worm axial displacement. Consequently, accuracy of measurement is low.

Motor-operated valves are constructed in such a way that they automatically stop operation when a preset torque is reached. Many of the failures motor-operated valves experience are caused by reduction in this preset torque value. A change in the preset torque value is often attributable to a change in the preload of the spring cartridge caused by wear or similar problems of the disc springs.

The present invention has been made in view of the aforementioned circumstances. It is an object of the present invention to provide a diagnostic method and apparatus which can produce a diagnosis of a motor-operated valve, in which a specific load including at least the preload of a spring cartridge can be measured in an inexpensive, simple, and accurate manner, at all times and in which a torque curve is calibrated based on the load obtained and the motor-operated valve is then diagnosed based on the calibrated torque curve.

Means for Solving the Problems

To solve the above mentioned problems, the motor-operated valve diagnostic method and apparatus according to the invention is constructed as described below.

The motor-operated valve diagnostic method of the invention as claimed in claim 1 is a motor-operated valve diagnostic method for diagnosing a motor-operated valve comprising a valve disc for opening and closing a given passage, a worm rotatably driven by motor power, a link mechanism which opens and closes the valve disc with the rotational driving force transmitted from the worm, and a spring cartridge containing disc springs which expand or compress in response to reaction force acting on the worm in its axial direction from the link mechanism, said method being characterized in that a torque curve representing the elastic characteristics of the spring cartridge is calibrated based on a load corresponding to a specific compression condition of the spring cartridge and in that the motor-operated valve is diagnosed based on the torque curve thus calibrated.

In accordance with the motor-operated valve diagnostic method of the invention as claimed in claim 1, constructed as described above, the torque curve of the spring cartridge is calibrated based on the load corresponding to a specific compression condition of the spring cartridge, and based on the torque curve thus calibrated, a diagnosis of the motor-operated valve is produced. Accordingly, an easy and quick diagnosis can be achieved on whether the torque-related characteristics of the motor-operated valve are appropriate or not.

The motor-operated valve diagnostic method according to claim 2 is a motor-operated valve diagnostic method as claimed in claim 1, characterized in that the load corresponding to the specific compression condition of the spring cartridge includes at least a preload of the spring cartridge.

The specific compression condition to which the preload corresponds is the compression condition of the spring cartridge at the time when the spring cartridge begins to deform due to the reaction force (i.e., the starting time of compression), that is, at the time when the amount of compression (i.e., the amount of deformation) of the spring cartridge is zero immediately before turning positive. This can be detected as a point in time when the worm begins to move axially.

"The load including at least the preload" comprises a concept encompassing not only the preload itself of the spring cartridge but also a load corresponding to a specific compression condition which is different from the one corresponding to the preload. An example of this is a load corresponding to a compression condition at the time when the torque switch is actuated.

The motor-operated valve diagnostic method according to claim 3 is a motor-operated valve diagnostic method as claimed in claim 1 or claim 2, characterized in that a condition of compression of the spring cartridge resulting from the reaction force is detected as a worm axial displacement, in that a given physical quantity corresponding to a load which corresponds to the specific compression condition of the spring cartridge is detected, and in that the load corresponding to the specific compression condition of the spring cartridge based on the given physical quantity is then detected.

The link mechanism comprises components including, but not limited to, a gear engaging the worm, a drive sleeve rotating as the gear rotates, a stem nut rotating integrally with the drive sleeve and having female threads formed around its inner surface, and a valve stem connected to the valve disc at one end and having male threads on the other around its outer surface so that the male threads engage the female threads of the stem nut to allow the valve stem to move axially as the stem nut rotates.

Detection of a point in time when the worm begins to move axially may be made by either of the following: continuous monitoring of and detection of a change in the distance between the reference position (the drive casing of the motor-operated valve) and the axial end surface or other part of the worm or any part which can be considered substantially identical to the worm axial end surface (e. g., a compression plate of the spring cartridge, the end surface of the locknut provided at the end surface of the spring cartridge); or physical detection of an instant at which the worm begins to move.

Continuous monitoring of the distance as described above is preferable by reason that it allows routine control of this distance, facilitating early identification of any sign of change in the value of the distance.

A given physical quantity corresponding to a load which corresponds to the specific compression condition of the spring cartridge refers to a physical quantity of various kinds from which load acting on the spring cartridge can be calculated. Examples may be stress acting on other component part or an elapsed time.

The stress acting on the link mechanism is a specific example of this physical quantity. Contact of the valve disc to the valve seat in the closing movement or contact of the valve disc to the physical stopper in the opening movement (hereinafter the term "the valve disc contacting the valve seat" includes also "the valve disc contacting the physical stopper in the opening movement") produces stress in the link mechanism. This stress in turn becomes a load to displace the worm. Therefore, the stress acting on the link mechanism has a direct corresponding relation with the load acting on the spring cartridge, as long as the spring constant of the spring cartridge remains constant.

In addition, the stress acting on the yoke which covers the valve stem can also be an example of a given physical quantity mentioned above, as stress on the link mechanism produces reaction force on the yoke.

Meanwhile, an elapsed time t0 between the valve disc-to-seat contact and the start of the worm axial displacement is given by t0=F0/v, where F0 is the preload of the spring cartridge and v is a rate of increase with time of the load acting on the spring cartridge (load applied to the worm=load applied to the disc springs) and assumed to be constant.

Therefore, the elapsed time t0 between the valve disc-to-seat contact and the start of the worm axial displacement may also be used as a given physical quantity, in stead of stress $\sigma$ acting on the link mechanism.

In this case, it is necessary to detect a point in time when the valve disc contacts the valve seat. This point in time of valve disc-to-seat contact may be detected from a change in the stress or the like acting on the link mechanism or on the yoke covering the link mechanism. Alternatively, the point in time of valve disc-to-seat contact may be detected based on a duration of time elapsed from the time when a specified point on the valve stem or other part of the link mechanism passes a specified position. This is because tk, which is an elapsed time between the time when the specified point on the link mechanism passes the specified position and the time of the valve disc-to-seat contact, is constant, as long as the working speed of the valve stem is constant.

The elapsed time t before the worm begins to move is expressed by t=tk+t0, wherein only t0 will change, with tk remaining unchanged whether the disc springs are worn or not. Therefore, by detecting a time difference $\Delta t$ (t−t'=t0−t1) between the elapsed time t before wear and the elapsed time t' after wear, the elapsed time t1 between the valve disc-to-seat contact and the start of the worm displacement after wear can be determined.

As explained, in accordance with the motor-operated valve diagnostic method of the invention as claimed in claim 3, it is possible to detect the given physical quantity corresponding to a load which corresponds to a specific compression condition of the spring cartridge and then determine a load corresponding to a specific compression condition of the spring cartridge based on this detected physical quantity.

Detection of the load corresponding to a specific compression condition of the spring cartridge in turn enables determination of the torque curve of the spring cartridge in which effects of wear or the like on the disc springs are reflected. Accordingly, an easy and quick diagnosis can be achieved on whether the torque-related characteristics of the motor-operated valve are appropriate or not.

Additionally, as there is no need to directly measure the load acting on the spring cartridge, installation of a large load cell or the like is not necessary. Nor, is it necessary to remove the spring cartridge from the motor-operated valve for taking measurement thereon. The motor-operated valve diagnostic apparatus of the invention can thus be installed permanently on the motor-operated valve, enabling an easy diagnosis of the motor-operated valve during its actual operation at low costs, with high accuracy, and with ease.

When the motor-operated valve diagnostic method of the invention as claimed in claim 3 is constructed in such a way that "the starting time of the spring cartridge deformation caused by the act of compression thereon which results from the reaction force acting on the worm in its axial direction is detected as the starting time of the worm axial displacement", detection of the starting time of the worm axial displacement and of a given physical quantity corresponding to the preload of the spring cartridge at the starting time of the worm axial displacement will make it possible to detect, based on the detected physical quantity, the preload of the spring cartridge. Accordingly, a construction like this is extremely useful where a diagnosis is made on the motor-operated valve based on the preload.

The motor-operated valve diagnostic method according to claim 4 is a motor-operated valve diagnostic method as claimed in claim 3, characterized in that the worm displacement is detected by monitoring the position of the spring cartridge shaft end moving axially together with the worm or of the peripheral part thereof fixed thereto and moving together therewith.

Monitoring the position of the spring cartridge shaft end means indirectly monitoring the worm axial position by monitoring a position of the spring cartridge shaft end which can be regarded as identical to the worm axial position.

The spring cartridge shaft end includes the peripheral part thereof which can be considered substantially identical to the shaft end.

For example, when a compression plate or a locknut which moves integrally with the spring cartridge shaft end is fitted to this shaft, the end surface of this locknut or other can be considered substantially identical to the shaft end and may be chosen as the position to monitor.

In accordance with the motor-operated valve diagnostic method of the invention as claimed in claim 4, constructed as described above, the worm axial displacement is detected by monitoring the position of the spring cartridge shaft end. Measurement on the shaft end is possible simply by removing the cover covering the spring cartridge shaft from the casing of the valve. Hence, the start of the worm displacement or the absolute position between the spring cartridge shaft end and the end surface of the casing or other can be detected more easily than making measurement on the worm positioned deep within the casing of the valve.

The cover on the casing may be replaced by an adapter (i.e., a modified cover) having a measurement hole with a cap.

The motor-operated valve diagnostic method according to claim 5 is a motor-operated valve diagnostic method as claimed in claim 4, characterized in that the worm displacement is detected by monitoring, by means of a worm position sensor, the position of the spring cartridge shaft end or of the peripheral part thereof fixed thereto and moving together therewith, the worm position sensor being mounted on the motor-operated valve with the use of an adaptor, the adapter being placed between the worm position sensor and the motor-operated valve, replacing the cover covering the spring cartridge and having an insertion length substantially identical to that of the cover.

The insertion length is equivalent to the depth in the insertion hole, where the spring cartridge is inserted, from the external surface (end surface) of the casing housing the spring cartridge to the compression plate of the spring cartridge.

The inserted part of the cover contacts the compression plate of the spring cartridge, restraining the entire spring cartridge to move.

In accordance with the motor-operated valve diagnostic method of the invention as claimed in claim 5, constructed as described above, there is provided an adapter, in place of the cover, the adapter having an insertion length almost identical with that of the cover. Accordingly, during the motor-operated valve operation with the adapter fitted, the spring cartridge operates under the almost same condition as the condition with the cover fitted, enabling a diagnosis with increased accuracy on the motor-operated valve during its actual operation.

Moreover, the starting position of the worm displacement can be controlled using the absolute position of the spring cartridge relative to the reference position on the motor-operated valve, with the adaptor fitted. Thus, even in cases where there is a slight error in the insertion length between the cover and the adapter, or where the adapter is changed with another having a slightly different insertion length, it is possible to correct these errors and differences based on the absolute position, thereby enabling an accurate determination of the preload.

Still further, the worm axial displacement for detecting the compression condition of the spring cartridge is detected by monitoring the position of the spring cartridge shaft end with the use of the adaptor. Measurement on the spring cartridge shaft end is possible simply by removing the cover covering the spring cartridge shaft from the casing of the valve and replacing it with the adapter. Thus, the worm displacement or the absolute position between the shaft end and the end surface of the casing or other can be detected more easily than making measurement on the worm positioned deep within the casing of the valve.

The motor-operated valve diagnostic method according to claim 6 is a motor-operated valve diagnostic method as claimed in any one of claims 3 to 5, characterized in that the aforementioned given physical quantity is the stress acting on the link mechanism or the reaction stress generated in an area subjected to the stress acting on the link mechanism when the spring cartridge is under the specific compression condition; and in that a reference is made to the pre-established corresponding relation between the stress or reaction stress and the load acting on the spring cartridge so that the load corresponding to the specific compression condition of the spring cartridge can be detected based on the stress or reaction stress.

The stress acting on the link mechanism is stress generated by the valve disc-to-seat contact. This stress is transmitted to the spring cartridge by way of the worm to act as a load thereon (compression force). The load acting on the spring cartridge and the amount of compression x on the spring cartridge (i.e., the amount of worm displacement) resulting from this load has a corresponding relation, $F=F0+k\times x$, ($F0$=preload), provided that the spring constant k remains unchanged with time. The compression force is proportionally related to the torque by the expression, (load F)×(distance d from the valve stem center to the worm tooth face)=torque T.

The stress $\sigma 0$ acting on the link mechanism when the worm begins to move in the axial direction corresponds to the preload of the spring cartridge. Therefore, by detecting the stress acting on the link mechanism and referring this detected stress to the corresponding relation $F=f(\sigma)$, it is possible to determine the preload $F0=f(\sigma 0)$.

The reaction stress generated in an area subjected to stress acting on the link mechanism is reaction force produced in response to the stress acting on the link mechanism at the time of the valve disc-to-seat contact. This reaction force is generated in the yoke covering the link mechanism, for example, and transmitted to the spring cartridge by way of the worm to act as a load thereon (compression force).

The reaction stress occurring in the yoke when the worm begins to move in the axial direction also corresponds to the preload of the spring cartridge. Therefore, by detecting the reaction stress acting on the yoke and referring this detected reaction stress to the aforementioned corresponding relation, it is possible to determine the preload.

Accordingly, in accordance with the motor-operated valve diagnostic method of the invention as claimed in claim 6, by drawing the torque curve $T=d\times F=d\times(F0+k\times x)$ using the preload F0 determined as described above, it is possible to determine the torque curve in which the effects of wear or the like on the disc springs are reflected (i.e., a calibrated torque curve). Thus, an easy and quick diagnosis can be achieved, based on the calibrated torque curve, on whether the torque-related characteristics of the motor-operated valve are appropriate or not.

Furthermore, measurement of stress acting on the link mechanism is easier than direct measurement of a load acting on the spring cartridge. Thus, diagnostic activities can be reduced.

The motor-operated valve diagnostic method according to claim 7 is a motor-operated valve diagnostic method as claimed in claim 6, characterized in that an area subjected to the stress includes the yoke covering the link mechanism, the spring cartridge, or other area where stress changes integrally with that in the spring cartridge.

The aforementioned stress acting on the link mechanism is applied directly to the yoke covering the link mechanism to generate reaction stress therein and transmitted further to the spring cartridge and an area where stress changes integrally with that in the spring cartridge, for example, the cover attached to the spring cartridge shaft end. This means that determination of the stress acting on the link mechanism does not have to depend on direct measurement thereof; instead, the stress can be made known by measuring the reaction stress in the yoke or other area. The reaction stress generated in the yoke can be measured more easily than the stress acting on the link mechanism. Measurement thereof is thus most appropriate in terms of reducing diagnostic activities.

In accordance with the motor-operated valve diagnostic method of the invention as claimed in claim 7, reaction stress generated in the yoke covering the link mechanism, in the spring cartridge, or in an area where stress changes integrally with that in the spring cartridge corresponds to a specific compression condition of the spring cartridge; it is therefore possible to detect a load corresponding to a specific compression condition of the spring cartridge based on the reaction force, when reference is made to the pre-established corresponding relation between the stress or the reaction stress and the load acting on the spring cartridge.

The load thus determined can then be used to calibrate the torque curve of the spring cartridge, and based on this calibrated torque curve, an easy and quick diagnosis can be achieved on whether the torque-related characteristics of the motor-operated valve are appropriate or not.

Furthermore, measurement of reaction stress acting on the yoke or other part is easier than direct measurement of load acting on the spring cartridge. Thus, diagnostic activities can be reduced.

The motor-operated valve diagnostic method according to claim 8 is a motor-operated valve diagnostic method as claimed in any one of claims 3 to 5, characterized in that the aforementioned given physical quantity is the elapsed time between a given reference time and the starting time of the worm displacement; and in that a reference is made to the corresponding relation between the elapsed time and the load acting on the spring cartridge so that the preload of the spring cartridge can be detected based on the elapsed time.

The given reference time is most preferably a point in time such as the time of the valve disc-to-seat contact, as explained in claim 3.

The time of the valve disc-to-seat contact may be detected based on, for example, a change in stress acting on the link mechanism, the yoke, or other area.

If direct detection of the time of the valve disc-to-seat contact is not possible, then a point in time when a specified point on the valve stem passes a specified position, for example, may be used as an alternative of the time of the valve disc-to-seat contact.

If it is the time when a specified point on the valve stem passes a specified position, instead of the time of the valve disc-to-seat contact, that is to be detected, a position sensor or the like may be used to detect this time when a specified point on the valve stem passes a specified position.

In accordance with the motor-operated valve diagnostic method of the invention as claimed in claim 8, constructed as described above, it is possible to determine the preload of the spring cartridge by referring to the corresponding relation between the load acting on the spring cartridge and the elapsed time elapsed from the given reference time to the starting time of the worm axial displacement.

The preload thus determined can then be used to determine the torque curve in which the effects of wear or the like on the disc springs are reflected, that is, a calibrated torque curve. Based on this calibrated torque curve, an easy and quick diagnosis can be achieved on whether the torque-related characteristics of the motor-operated valve are appropriate or not.

In this method, it is not a value of stress acting on the link mechanism or the yoke that is detected. And for the detection of the valve disc-to-seat contact, the method simply uses a change in stress, an elapsed time, or others. The physical quantity is simpler to measure in this method than in the method which detects a value of stress acting on the link mechanism or other component part. Because of no need for detection of a value of stress on such a component part, diagnostic activities can further be reduced.

The motor-operated valve diagnostic method according to claim 9 is a motor-operated valve diagnostic method as claimed in claim 8, characterized in that the aforementioned given reference time is the time of the valve disc-to-seat contact.

As aforementioned, the valve disc-to-seat contact includes not only valve disc-to-seat contact as normally referred to for the valve closing operation, but also the valve disc contact to the physical stopper in the valve opening operation.

In accordance with the motor-operated valve diagnostic method as claimed in claim 9, constructed as described above, it is possible to determine the preload of the spring cartridge with high accuracy, as the elapsed time elapsed from the valve disc-to-seat contact to the starting time of the worm displacement corresponds better to the load acting on the spring cartridge than the time elapsed from a different reference time.

The motor-operated valve diagnostic method according to claim 10 is a motor-operated valve diagnostic method as claimed in claim 9, characterized in that the time of the valve disc-to-seat contact is detected based on a change in stress acting on the link mechanism or a change in reaction stress generated in an area subjected to the stress acting on the link mechanism, for example, the yoke covering the link mechanism, the spring cartridge, or an area where stress changes integrally with that in the spring cartridge.

In accordance with the motor-operated valve diagnostic method as claimed in claim 10, constructed as described above, it is possible to determine the preload of the spring cartridge with increased accuracy, as the time of the valve disc-to-seat contact can be detected accurately based on a change in stress.

The motor-operated valve diagnostic method according to claim 11 is a motor-operated valve diagnostic method as claimed in any one of claims 1 to 10, characterized in that the elastic characteristics of the spring cartridge is further determined by an externally-attached torque sensor, a spring pressing device, or a spring cartridge calibrator.

The spring pressing device herein is installed, in place of the worm position sensor, into the insertion hole where the spring cartridge is placed. This device presses the compression plate of the spring cartridge in the axial direction thereof and, while doing so, detects its pressing force. On the other hand, the device also detects the displacement of the compression plate using a non-contact type stroke sensor while remaining in contact with the compression plate. The device then determines the corresponding relation between the amount of the compression plate displacement and the pressing force. This relation in turn determines the elastic characteristics of the spring cartridge such as the spring constant or preload.

The adaptor used for installing the spring pressing device into the insertion hole may be different from or the same as the one used for mounting the worm position sensor. When the same adapter is used, the number of components parts can be reduced.

In accordance with the motor-operated valve diagnostic method of the invention as claimed in claim 11, constructed as described above, the externally-attached torque sensor, the spring pressing device, or the spring cartridge calibrator may be temporarily placed or installed to calibrate the elastic characteristics of the spring cartridge for verification purpose. Consequently, even if the elastic characteristics of the spring cartridge such as the spring constant change, the torque curve can be properly calibrated to accommodate this change in the elastic characteristics. Thus, by performing the calibration of the elastic characteristics during extensive maintenance of the motor-operated valve, for example, during its periodic inspection, a diagnosis with enhanced accuracy can be achieved.

The motor-operated valve diagnostic method according to claim 12 is a motor-operated valve diagnostic method as claimed in any one of claims 1 to 11, characterized in that when a hysteresis exists in the elastic characteristics of the spring cartridge between the valve disc closing movement from the full open position and the valve disc opening movement from the full close position, a spring pressing device added with the function of an externally-attached torque sensor is used to determine the elastic characteristics of the spring cartridge in such a manner that the elastic characteristics of the spring cartridge for the valve disc opening movement from the full close position are determined by means of the spring pressing device, while the elastic characteristics of the spring cartridge for the valve disc closing movement from the full open position are determined by the function of an externally-attached torque sensor, with the motor-operated valve in operation.

The disc springs of the spring cartridge are compressed during both opening and closing of the valve disc. Thus, the theoretical assumption is that the disc springs would show the same elastic characteristics in either of these valve disc movements. In actuality, however, for a reason attributable to how the disc springs stay or others, the elastic characteristics are not always the same between the valve disc opening and closing, with a gap (i.e., a hysteresis) existing between these two movements. In such a case, it is necessary to determine the torque curve separately for each of the two movements.

The function, added to the spring pressing device, to work as an externally-attached torque sensor refers to the conventional function of externally-attached sensors, that is, the capability of a load cell provided within the spring pressing device to measure a load pressing the load cell from where the spring cartridge is as well as the capability of the stroke sensor to measure displacement of the spring cartridge shaft (the displacement may be that of other part considered identical to the displacement of the spring cartridge shaft; the same applies hereinafter). The direction in which the spring pressing device applies a pressing force is the same as the direction into which the spring cartridge is compressed during valve opening. On the other hand, the externally-attached sensor is adapted to detect a torque (or load acting on the spring cartridge) and amount of worm displacement during valve closing.

As explained, using the spring pressing device added with the function such as that of an externally-attached sensor that can detect a torque and an amount of worm displacement during valve closing, the elastic characteristics of the spring cartridge during valve closing can be measured by the function of an externally-attached sensor, with the motor-operated valve in operation. The elastic characteristics of the spring cartridge during valve opening, on the other hand, can be measured by the spring pressing device itself. In this case, it is not necessary that the motor-operated valve be in operation. Thus, measurement can be made at a time of user's choice.

In accordance with the motor-operated valve diagnostic method of the invention as claimed in claim 12, constructed as described above, even if the elastic characteristics of the spring cartridge differs between valve disc opening and closing movements because of hysteresis, the elastic characteristics for each of the two movements can be determined separately with high accuracy.

Furthermore, by adding the function of an externally-attached torque sensor to the spring pressing device, it is possible to reduce not only the frequency of mounting and dismounting equipment on and from the motor-operated valve but also the number of component parts to be used, as compared to separate provision of an externally-attached torque sensor and a spring pressing device. It is further possible to determine the elastic characteristics of the spring cartridge efficiently for both the valve disc opening and closing movements.

The motor-operated valve diagnostic apparatus according to the invention is an apparatus for effecting the motor-operated valve diagnostic method of the invention. The apparatus detects, by means of a strain sensor or other type of stress sensor, stress generated in the link mechanism or the yoke at the starting time of the worm displacement, that is, at the starting time of the spring cartridge deformation, during motor-operated valve operation. Alternatively, the apparatus detects an elapsed time between a given reference time and the starting time of the worm displacement, using a timer or elapsed time counter (e.g., a time counter, a pulse counter). The apparatus then calibrates the torque curve based on the value thus detected, and based on the calibrated torque curve, produces a diagnosis of the motor-operated valve.

The motor-operated valve diagnostic apparatus according to claim 13 is an apparatus for diagnosing a motor-operated valve, the motor-operated valve comprising a valve disc for opening and closing a given passage, a worm rotatably driven by motor power, a link mechanism which opens and closes the valve disc with the rotational driving force transmitted from the worm, and a spring cartridge containing disc springs which expand or compress in response to reaction force acting on the worm in its axial direction from the link mechanism, the apparatus being characterized by comprising a diagnostic device which calibrates the torque curve representing the elastic characteristics of the spring cartridge based on a load corresponding to a specific compression condition of the spring cartridge and including at least the preload of the spring cartridge and which then produces a diagnosis of the motor-operated valve based on the torque curve thus calibrated.

In accordance with the motor-operated valve diagnostic apparatus of the invention as claimed in claim 13, constructed as described above, the torque curve of the spring cartridge is calibrated based on the load corresponding to a specific compression condition of the spring cartridge and including at least the preload of the spring cartridge, and based on the torque curve thus calibrated, a torque-related diagnosis of the motor-operated valve is produced. Accordingly, an easy and quick diagnosis can be achieved on whether the torque-related characteristics of the motor-operated valve are appropriate or not.

The motor-operated valve diagnostic apparatus according to claim 14 is a motor-operated valve diagnostic apparatus as claimed in claim 13, characterized by further comprising a worm position sensor for detecting a condition of compression of the spring cartridge, which results from the aforementioned reaction force, as a worm axial displacement, and a stress sensor for detecting stress acting on the link mechanism or reaction stress generated in an area subjected to the stress acting on the link mechanism, wherein the aforementioned diagnostic device is configured to detect a load corresponding to the specific compression condition of the spring cartridge based on the stress detected by the stress sensor when the spring cartridge is under compression condition, the load including at least the preload of the spring cartridge, and the compression condition including at least a compression condition at the starting time of the spring cartridge deformation detected by the worm position sensor.

When it is the worm absolute axial position that is to be detected, detection of the start of the worm displacement is to be made by the decision that there has been a change in the value of the absolute position being detected. The capability for generating this decision need not be incorporated in the worm sensor itself; instead, it may be made part of the functions of the diagnostic means (or diagnostic device). Further, an absolute position from the end surface of the casing or the like to the spring cartridge shaft end (e.g., to the compression plate or to the end surface of the locknut provided at the spring cartridge shaft end) may be detected and this detected absolute position may be used as diagnostic data.

When an output means (or output device) is provided, it may include a wide range of output devices: for example, a display, a monitor, or other display devices that output diagnostic results visually; a printer, a plotter, and other printing devices; and a flexible disc, CD-R, and other storage media.

In accordance with the motor-operated valve diagnostic apparatus of the invention as claimed in claim 14, stress acting on the link mechanism or reaction stress generated in an area subjected to the stress in the link mechanism is detected by the stress sensor when the spring cartridge is under compression condition. This compression condition includes at least a compression condition at the starting time of the spring cartridge deformation detected by the worm position sensor. The stress corresponds to a load corresponding to a specific compression condition of the spring cartridge. This load includes at least the preload of the spring cartridge. Accordingly, the torque curve is calibrated, based on the load detected, for the corresponding specific compression condition, and based on the torque curve thus calibrated, a torque-related diagnosis of the motor-operated valve is produced. Accordingly, an easy and quick diagnosis can be achieved on whether the torque-related characteristics of the motor-operated valve are appropriate or not.

Furthermore, the apparatus is constructed to detect a load which corresponds to a specific compression condition of the spring cartridge based on the stress acting on the link mechanism or reaction stress generated in an area subjected to the stress acting on the link mechanism. Thus, installation of a large load cell or the like is not necessary to directly measure load acting on the spring cartridge; nor is it necessary to remove the spring cartridge for taking measurement thereon. The apparatus is of a simple structure, and yet it can diagnose the condition of a motor-operated valve during its actual operation at low costs with high accuracy and with ease. It can also be installed on a motor-operated valve on a permanent basis.

The worm position sensor described above is a sensor which detects the starting time of the spring cartridge deformation as the starting time of the worm axial displacement, or which detects the condition of spring cartridge compression as the worm axial displacement. The worm position sensor is not limited to the above, as long as it can detect the starting time of the spring cartridge deformation or the condition of the spring cartridge compression.

The aforementioned diagnostic means (or diagnostic device) detects a load corresponding to a specific compression condition of the spring cartridge based on the stress detected by the stress sensor at the time when the spring cartridge is under compression condition. The load includes at least the preload of the spring cartridge. The compression condition includes at least a compression condition at the starting time of the spring cartridge deformation detected by the worm position sensor. Accordingly, the torque curve of the spring cartridge is calibrated based on the load detected, and based on the torque curve thus calibrated, a torque-related diagnosis of the motor-operated valve is produced. Accordingly, an easy and quick diagnosis can be achieved on whether the torque-related characteristics of the motor-operated valve are appropriate or not.

Furthermore, the diagnosis can be made not only during plant outage but also during plant operation. This permits inspection activities which tend to concentrate in an outage period to be spread out.

When the motor-operated valve diagnostic apparatus of the invention as claimed in claim 14 is constructed in such a way that "the starting time of the spring cartridge deformation caused by the act of compression thereon which results from the reaction force acting on the worm in its axial direction is detected as the starting time of the worm axial displacement", detection of the starting time of the worm axial displacement and of a given physical quantity corresponding to the preload of the spring cartridge at the starting time of the worm axial displacement will make it possible to detect, based on this detected physical quantity, the preload of the spring cartridge. Accordingly, a construction like this is extremely useful where a diagnosis is made on the motor-operated valve based on the preload.

The motor-operated valve diagnostic apparatus according to claim 15 is a motor-operated valve diagnostic apparatus as claimed in claim 14, characterized in that the stress sensor is configured to detect the reaction stress generated in the yoke covering the link mechanism, in the spring cartridge, or in an area where stress changes integrally with that in the spring cartridge.

An area where stress changes integrally with that in the spring cartridge is, for example, a cover provided at the spring cartridge shaft end in contact therewith or an adaptor attached in place of the cover.

In accordance with the motor-operated valve diagnostic apparatus of the invention as claimed in claim 15, the stress sensor detecting reaction stress generated in an area subjected to stress acting on the link mechanism is adapted to detect reaction stress generated in the yoke covering the link mechanism, or in the spring cartridge, or in an area where stress changes integrally with that in the spring cartridge. Thus, installation of a large load cell or the like is not necessary; nor is it necessary to remove the spring cartridge for taking measurement thereon. The apparatus is of a simple structure, and yet it can diagnose the condition of a motor-operated valve during its actual operation at low costs with high accuracy, when mounted on a motor-operated valve on a permanent basis.

Further, the torque curve is calibrated, based on the load detected by the worm position sensor, for the corresponding specific compression condition, and based on the torque curve thus calibrated, a torque-related diagnosis of the motor-operated valve is produced. Accordingly, an easy and quick diagnosis can be achieved on whether the torque-related characteristics of the motor-operated valve are appropriate or not.

Still further, the diagnosis can be made not only during plant outage but also during plant operation. This permits inspection activities which tend to concentrate in an outage period to be spread out.

The motor-operated valve diagnostic apparatus according to claim 16 is a motor-operated valve diagnostic apparatus as claimed in claim 13, characterized by comprising a worm position sensor for detecting the starting time of the spring cartridge deformation, caused by the act of compression thereon resulting from the aforementioned reaction force, as the starting time of the worm axial displacement, and a timer for measuring an elapsed time between a given reference time and the starting time of the spring cartridge deformation, wherein the aforementioned diagnostic device is configured to detect the preload of the spring cartridge based on the elapsed time measured by the timer.

The timer (or elapsed time counter) is not limited to a device that measures an elapsed time, that is, a time interval (a relative time from the reference time), but may be of the type that specifies an absolute time (a point in time).

When the timer (or elapsed time counter) is of the type that specifies an absolute time, an elapsed time is to be determined by calculating a time difference between the reference time and the starting time of the worm displacement. The capability for calculating this time difference need not be incorporated in the timer (or elapsed time counter) itself; instead, it may be made part of the functions of the diagnostic means (or diagnostic device).

In addition, the timer (or elapsed time counter) need not be a physically independent component; instead, it may be provided as part of the functions of the diagnostic means (or diagnostic device).

The given reference time is a time when the valve disc contacts the valve seat or a time when a specified position on the valve stem or other part of the link mechanism passes a specified position. To detect a point in time such as these, a stress sensor that detects the time of the valve disc-to-seat contact or a position sensor that detects a time when a specified point on the link mechanism passes a specified position, and the like may be used.

In accordance with the motor-operated valve diagnostic apparatus of the invention as claimed in claim 16, constructed as described above, the preload of the spring cartridge is detected based on the elapsed time between the given reference time detected by the time measure (or timer) and the starting time of the spring cartridge deformation. Thus, installation of a large load cell or the like is not necessary to directly measure load acting on the spring cartridge; nor is it necessary to remove the spring cartridge for taking measurement thereon. It is not necessary, either, to attach a stress sensor to the link mechanism, the yoke, or other part to determine a value of stress. Thus the apparatus is of an even simpler structure, and yet it can diagnose the condition of a motor-operated valve during its actual operation at low costs with high accuracy, when mounted on a motor-operated valve.

Further, the torque curve of the spring cartridge is calibrated based on the preload mentioned above, and based on the torque curve thus calibrated, a torque-related diagnosis of the motor-operated valve is produced. Accordingly, an easy and quick diagnosis can be achieved on whether the torque-related characteristics of the motor-operated valve are appropriate or not.

Further, the diagnosis can be made not only during plant outage but also during plant operation. This permits inspection activities which tend to concentrate in an outage period to be spread out.

Still further, because of its simple structure, the apparatus can be installed on a motor-operated valve on a permanent basis.

The motor-operated valve diagnostic apparatus according to claim 17 is a motor-operated valve diagnostic apparatus as claimed in claim 16, characterized in that the aforementioned given reference time is the time when the valve disc contacts the valve seat, and in that the apparatus comprises a stress sensor which detects the time of the valve disc-to-seat contact based on a change in stress acting on the link mechanism or a change in reaction stress generated in an area subjected to the stress acting on the link mechanism, such as the yoke covering the link mechanism, the spring cartridge, or an area where stress changes integrally with that in the spring cartridge.

In accordance with the motor-operated valve diagnostic apparatus of the invention as claimed in 17, constructed as described above, it is possible to detect the time of the valve disc-to-seat contact accurately using a change in stress. Thus, the preload of the spring cartridge can be determined with increased accuracy.

The motor-operated valve diagnostic apparatus according to claim 18 is a motor-operated valve diagnostic apparatus as claimed in any one of claims 13 to 17, characterized by further comprising an externally-attached torque sensor, a spring pressing device, or a spring cartridge calibrator for detecting the elastic characteristics of the spring cartridge.

In accordance with the motor-operated valve diagnostic apparatus of the invention as claimed in claim 18, constructed as described above, the externally-attached torque sensor, the spring pressing device, or the spring cartridge calibrator may be temporarily placed or installed to calibrate the elastic characteristics of the spring cartridge for verification purpose. Consequently, even if the elastic characteristics of the spring cartridge such as the spring constant change, the torque curve can be properly calibrated to accommodate this change in the elastic characteristics. Thus, by performing the calibration of the elastic characteristics during extensive maintenance of the motor-operated valve, for example, during its periodic inspection, a diagnosis with enhanced accuracy can be achieved.

The externally-attached torque sensor, the spring pressing device, or the spring cartridge is to be placed or installed temporarily. Thus, it is preferable that they be mounted and dismounted easily.

The motor-operated valve diagnostic apparatus as according to claim 19 is a motor-operated valve diagnostic apparatus as claimed in any one of claims 13 to 18, characterized in that when a hysteresis exists in the elastic characteristics of the spring cartridge between the valve disc closing movement from the full open position and the valve disc opening movement from the full close position, the spring pressing device added with the function of an externally-attached torque sensor is used to determine the elastic characteristics of the spring cartridge in such a manner that the elastic characteristics of the spring cartridge for the valve disc opening movement from the full close position are determined by means of the spring pressing device, while the elastic characteristics of the spring cartridge for the valve disc closing movement from the full open position are determined using the function of an externally-attached torque sensor, with the motor-operated valve in operation.

The function, added to the spring pressing device, to work as an externally-attached torque sensor refers to the capability of the load cell provided within the spring pressing device to measure load pressing the load cell from where the spring cartridge is as well as the capability of the stroke sensor to measure displacement of the spring cartridge shaft In accordance with the motor-operated valve diagnostic apparatus of the invention as claimed in claim 19, constructed as described above, even if the elastic characteristics of the spring cartridge differs between valve disc opening and closing movements because of hysteresis, the elastic characteristics for each of the two movements can be determined separately with high accuracy.

Further, by adding the function of an externally-attached torque sensor to the spring pressing device, it is possible to reduce not only the frequency of mounting and dismounting equipment on and from the motor-operated valve but also the number of component parts to be used, as compared to separate provision of an externally-attached torque sensor and a spring pressing device. It is further possible to determine the elastic characteristics of the spring cartridge efficiently for both the valve disc opening and closing movements.

The motor-operated valve diagnostic apparatus according to claim 20 is a motor-operated valve diagnostic apparatus as claimed in claim 18 or 19, characterized in that the spring pressing device is installed to the motor-operated valve exchangeably with the worm position sensor.

In accordance with the motor-operated valve diagnostic apparatus of the invention as claimed in claim 20, constructed as described above, it is possible to easily change the worm position sensor mounted on the motor-operated valve with the spring pressing device to effect calibration of the elastic characteristics of the spring cartridge. Accordingly, calibration activities for the elastic characteristics can be reduced.

The motor-operated valve diagnostic apparatus according to claim 21 a motor-operated valve diagnostic apparatus as claimed in any one of claims 14 to 20, characterized in that the worm position sensor is mounted on the motor-operated valve with the use of an adapter, the adapter being placed between the worm position sensor and the motor-operated valve, replacing the cover covering the spring cartridge and having an insertion length almost identical to that of the cover.

In accordance with the motor-operated valve diagnostic apparatus of the invention as claimed in claim 21, constructed as described above, an adapter having an insertion length almost identical with that of the cover replaces the cover. Thus, during the motor-operated valve operation with the adapter fitted, it is possible for the spring cartridge to operate under the almost same condition as the condition with the cover fitted. Accordingly, a diagnosis with increased accuracy can be made on the motor-operated valve during its actual operation.

Moreover, the worm displacement starting position can be controlled using an absolute position of the spring cartridge relative to the reference position on the motor-operated valve with the adaptor fitted. Thus, even in cases where there is a slight error in the insertion length between the cover and the adapter or where the adapter is changed with another having a slightly different insertion length, it is possible to correct these errors and differences based on the absolute position, thereby enabling an accurate determination of the preload.

The motor-operated valve diagnostic apparatus according to claim 22 is a motor-operated valve diagnostic apparatus as claimed in any one of claims 13 to 21, characterized in that the worm position sensor comprises a laser sensor which detects the position of an object by irradiating a laser beam onto the object and detecting light reflected therefrom.

In accordance with the motor-operated valve diagnostic apparatus of the invention as claimed in claim 22, constructed as described above, the worm position sensor comprises a laser sensor. Accordingly, non-contact detection of a distance to an object is possible with high speed response and with high accuracy.

The motor-operated valve diagnostic apparatus according to claim 23 is a motor-operated valve diagnostic apparatus as claimed in any one of claims 13 to 22, characterized by further comprising an output device for outputting acceptance criteria relating to the diagnostic results or for the diagnostic data together with the diagnostic results and/or diagnostic data.

The acceptance criteria relating to the diagnostic results and the diagnostic data refers to the acceptance criteria (including reasons for decisions and explanatory notes) used for making a decision on the result of torque-related diagnosis using the torque curve and other data obtained. Outputting the acceptance criteria together with the diagnostic result or outputting the acceptance criteria together with the diagnostic data will help the user of the motor-operated valve diagnostic apparatus recognize a reason or a basis why that particular diagnostic result and/or data have been output. Thus, the apparatus is quite user friendly.

Further, the motor-operated valve diagnostic method and apparatus of the invention detects a given physical quantity at the starting time of the worm displacement generated during the motor-operated valve operation, and from this detected physical quantity, the preload of the spring cartridge is detected to produce a diagnosis of the condition of the motor-operated valve.

That is, the motor-operated valve diagnostic method of the invention according to claim 24 is a method for diagnosing a motor-operated valve, the motor-operated valve comprising a valve disc for opening and closing a given passage, a worm rotatably driven by an electromotive force, a link mechanism which opens and closes the valve disc with the rotational driving force transmitted from the worm, and a spring cartridge containing disc springs which expand or compress in response to reaction force acting on the worm in its axial direction from the link mechanism, the method being characterized in that the start of the worm axial displacement resulting from the reaction force is detected, in that a given physical quantity corresponding to the preload of the spring cartridge at the starting time of the worm displacement is detected, and in that a preload of the spring cartridge is detected from the detected physical quantity.

As explained, in accordance with the motor-operated valve diagnostic method of the invention as claimed in claim 24, a given physical quantity at the starting time of the worm axial displacement corresponds to the preload of the spring cartridge; it is therefore possible to determine the preload of the spring cartridge based on the physical quantity detected.

Accordingly, by detecting the preload determined as described above, it is possible to determine the torque curve in which the effects of wear or the like on the disc springs are reflected. Thus, an easy and quick diagnosis can be achieved on whether the torque-related characteristics of the motor-operated valve are appropriate or not.

Additionally, as there is no need to directly measure the load acting on the spring cartridge itself, installation of a large load cell or the like is not necessary. Nor, is it necessary to remove the spring cartridge from the motor-operated valve for taking measurement thereon. The diagnostic apparatus can thus be installed permanently on a motor-operated valve, enabling an easy diagnosis of a motor-operated valve during its actual operation at low costs with high accuracy.

The motor-operated valve diagnostic method according to claim 25 is a motor-operated valve diagnostic method as claimed in claim 24, characterized in that a torque curve representing the elastic characteristics of the spring cartridge is calibrated based on the detected preload of the spring cartridge, and in that a diagnosis of the motor-operated valve is made based on the torque curve thus calibrated.

In accordance with the motor-operated valve diagnostic method of the invention as claimed in claim 2, constructed as described, it is possible to determine the torque curve of the spring cartridge, based on the preload of the spring cartridge, for the corresponding specific condition of the spring cartridge, and by calibrating the original torque curve to the one thus determined, it is possible to achieve an easy and quick diagnosis on whether the torque-related characteristics of the motor-operated valve are appropriate or not.

The motor-operated valve diagnostic apparatus of the invention is an apparatus for effecting the motor-operated valve diagnostic method of the invention. The apparatus detects, by means of a strain sensor or the like, stress acting on the link mechanism or the yoke at the starting time of the worm displacement during motor-operated valve operation. Alternatively, the apparatus detects a change in the elapsed time between the given reference time and the starting time of the worm displacement by means of a timer or elapsed time counter (e.g., time counter, a pulse counter). Based on the value thus detected, a diagnostic device or diagnostic means then detects the preload of the spring cartridge containing the disc springs to produce a diagnosis of a motor-operated valve.

That is, the motor-operated valve diagnostic apparatus according to claim 26 is a motor-operated valve diagnostic apparatus for diagnosing a motor-operated valve, the motor-operated valve comprising a valve disc for opening and closing a given passage, a worm rotatably driven by motor power, a link mechanism which opens and closes the valve disc with the rotational driving force transmitted from the worm, and a spring cartridge containing disc springs which expand or compress in response to reaction force acting on the worm in its axial direction from the link mechanism, the apparatus being characterized by comprising a worm position sensor mounted on the motor-operated valve for detecting the start of the worm axial displacement, a stress sensor attached to the link mechanism for detecting stress acting on the link mechanism, a diagnostic device or diagnostic means for diagnosing the motor-operated valve based on the preload of the spring cartridge, the preload being detected based on the stress detected by the stress sensor at the starting time of the worm displacement detected by the worm position sensor, and an output device or output means for outputting the diagnostic results and/or diagnostic data obtained by the diagnostic device or diagnostic means.

When it is the worm absolute axial position that is to be detected, detection of the start of the worm displacement is to be made by the decision that there has been a change in the value of the absolute position being detected. The capability for generating this decision need not be incorporated in the worm sensor itself; instead, it may be made part of the functions of the diagnostic device or diagnostic means.

In addition, an absolute position from the end surface of the casing or the like to the end surface of the spring cartridge shaft may be detected and this detected absolute position may be used as diagnostic data.

An output device or output means may include a wide range of output devices: for example, a display, a monitor, or other display devices that output diagnostic results visually; a printer, a plotter, and other printing devices; and a flexible disc, CD-R, and other storage media.

In accordance with the motor-operated valve diagnostic apparatus of the invention as claimed in 26, constructed as described above, the stress in the link mechanism, which is detected by the stress sensor at the starting time of the worm displacement detected by the worm position sensor, corresponds to the preload of the spring cartridge. Thus, installation of a large load cell or the like is not necessary to directly measure load acting on the spring cartridge; nor is it necessary to remove the spring cartridge for taking measurement thereon. The apparatus is of a simple structure, and yet it can diagnose the condition of a motor-operated valve during its actual operation at low costs with high accuracy and with ease. It can also be installed on the motor-operated valve on a permanent basis.

The diagnosis device or diagnosis means then detects the preload of the spring cartridge based on the stress detected, determines the torque curve in which the effects of wear or the like on the disc springs are reflected. Accordingly, a diagnosis is produced on whether the torque-related characteristics of the motor-operated valve are appropriate or not, with the output device or output means outputting the diagnostic results or diagnostic data.

The diagnosis can be made whether a plant is in operation or at outage, permitting inspection activities which tend to concentrate in an outage period to be spread out.

The motor-operated valve diagnostic apparatus according to claim 27 is a motor-operated valve diagnostic apparatus as claimed in claim 26, characterized in that the aforementioned diagnostic device or diagnostic means calibrates the torque curve representing the elastic characteristics of the spring cartridge and, based on the torque curve thus calibrated, produces a diagnosis of the motor-operated valve.

In accordance with the motor-operated valve diagnostic apparatus of the invention as claimed in claim 27, constructed as described above, it is possible to determine the torque curve of the spring cartridge, based on the preload of the spring cartridge, for the corresponding specific condition of the spring cartridge, and by calibrating the original curve to the one thus determined, it is possible to achieve an easy and quick diagnosis on whether the torque-related characteristics of the motor-operated valve are appropriate or not.

BRIEF DESCRIPTION OF THE DRAWINGS

FIG. 1 is a block diagram showing one embodiment of the motor-operated valve diagnostic apparatus for practicing the motor-operated valve diagnostic method of this invention.

FIG. 3(*b*) is a view seen from the arrow A of FIG. 3(*b*); and FIG. 3(*c*) is a sectional view showing the spring cartridge before a worm position sensor is mounted.

FIG. 4(*b*) is a graph showing a corresponding relation between the elapsed time T and the stress σ of the valve stem; and FIG. 4(*c*) is a graph showing a corresponding relation between the stress σ and the load F acting on the disc springs (load acting on the spring cartridge).

FIG. 8(*b*) is a graph showing a corresponding relation between the change Δx in the amount of pre-compression of the disc springs and the preload F.

Figure 2A:
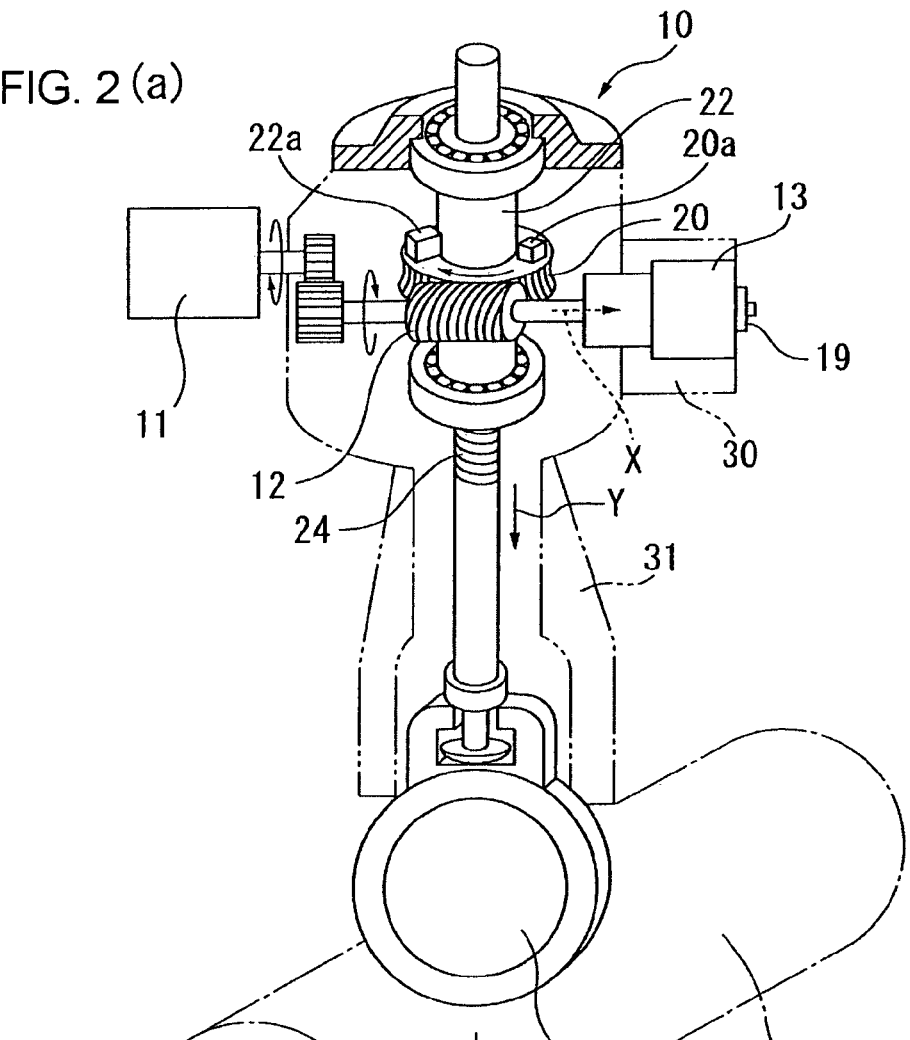
FIGS. 2(*a*) and 2(*b*) show a motor-operated valve to which the motor-operated valve diagnostic apparatus shown in FIG. 1 is to be applied, wherein FIG. 2(*a*) is a perspective view of the main components of the valve, while FIG. 2(*b*) is a cross sectional view of the drive sleeve of the valve.

Reference numerals denote the following component parts.

10 designates a motor-operated valve, 11 a motor, 12 a worm, 13 a spring cartridge, 14 a shaft, 15 a disc springs, 16 a limit sleeve, 17*a* and 17*b* spacers, 18 a locknut, 18*a* an end surface, 19 a cover, 20 a gear, 20*a* and 22*a* projections, 21 a stem nut, 22 a drive sleeve, 23 a torque switch (limit switch), 24 a valve stem, 25 a valve disc, 30 a casing, 31 a yoke, 50 a worm position sensor, 51 an adaptor, 52 a stay, 53 a laser sensor, 60 a stress sensor, 61 a stress sensor, 62 a timer (timer: elapsed time counter), 70 a diagnostic device, 71 and 72 LUT (reference table), 81 a monitor, 82 a printer, 90 a spring pressing device, 91 a contact support, 92 a linear gauge, 93 a pressing handle, 94 a load cell, 95 a pressing screw, 100 a motor-operated valve diagnostic apparatus, and 200 designates a pipe.

BEST MODE FOR CARRYING OUT THE INVENTION

Hereunder, specific embodiments of the motor-operated valve diagnostic method and apparatus of the invention will be described in detail referring to the drawings.

EMBODIMENT 1

FIG. 1 is a block diagram showing one embodiment of the motor-operated valve diagnostic apparatus for practicing the motor-operated valve diagnostic method of this invention. FIG. 2 shows a motor-operated valve to which the motor-operated valve diagnostic apparatus 100 shown in FIG. 1 is to be applied.

Figure 2B:
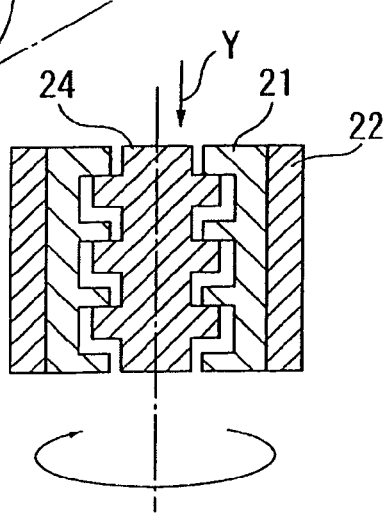
Figure 3:
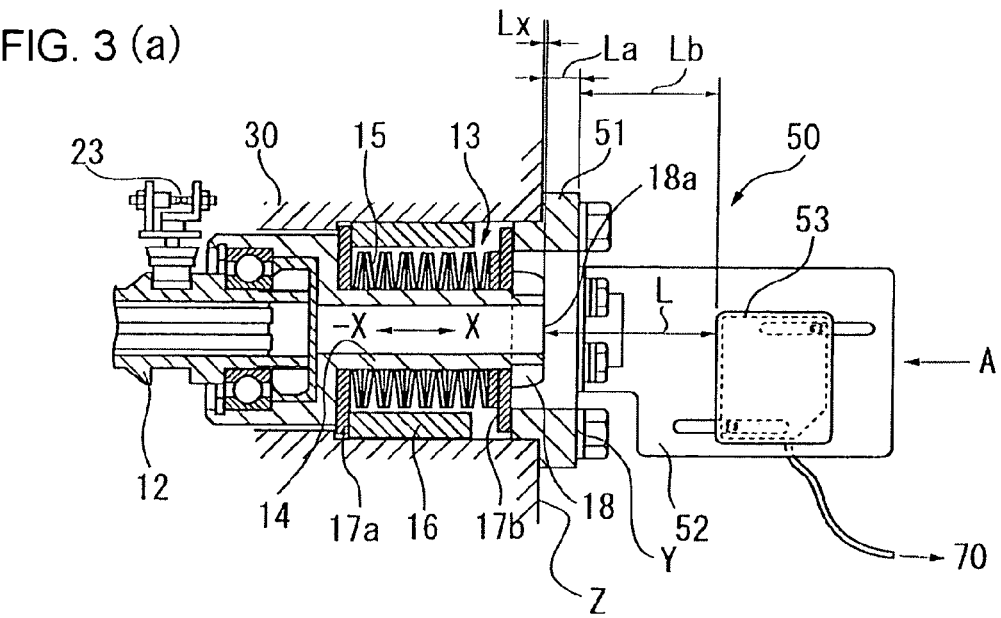
FIGS. 3(*a*)-3(*c*) show details of the spring cartridge, wherein FIG. 3(*a*) is a sectional view showing the spring cartridge with a worm position sensor mounted thereto.
Figure 3:
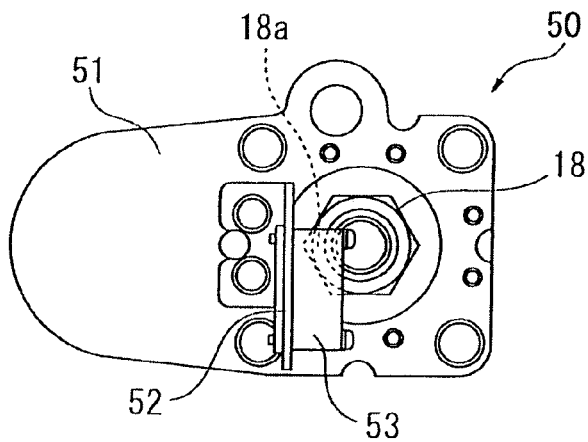
Figure 3:
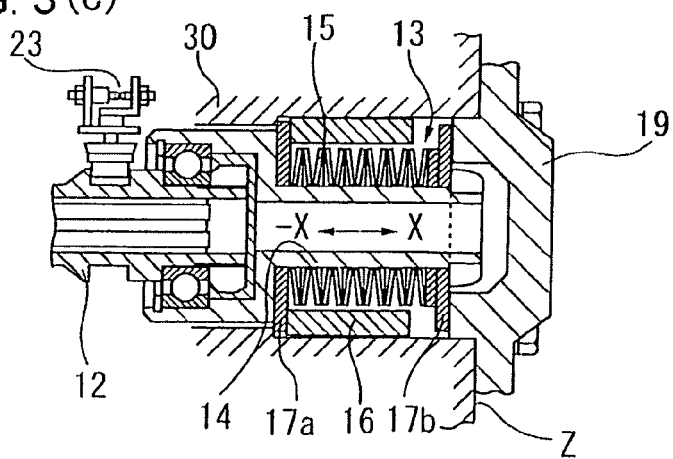

A motor-operated valve 10 of FIG. 1 is installed in a pipe 200 in a nuclear power plant, for example, and comprises a valve disc 25 for opening and closing a passage in the pipe 200, a worm 12 rotatably driven by motor power of the motor 11, a gear 20 constituting part of the link mechanism to open and close the valve disc 25, a drive sleeve 22, a stem nut 21 (see FIG. 2(b)) provided within the drive sleeve 22 and rotating together with the drive sleeve 22, a valve stem 24 engaging the stem nut 21, a spring cartridge 13 containing disc springs 15 (see FIG. 3) which expand or compress in response to reaction force acting on the worm 12 in the axial X direction from the link mechanism, a torque switch 23 which stops current flow to the motor 11 when the displacement of the work 12 reaches a predetermined amount, and a casing 30 covering the worm 12, the link mechanism, and the spring cartridge 13.

As shown in the sectional view of FIG. 3(c), the spring cartridge 13 comprises a shaft 14 moving in axial direction integrally with the worm 12, an inner spacer (compression plate) 17a moving in the X direction together with the shaft 14 while compressing the disc springs 15 when the spring cartridge 13 is compressed in the X direction, a plurality of the disc springs 15 fitted around the shaft 14 with the shaft 14 penetrating the center of the disc springs 15, an outer spacer (compression plate) 17b which holds the disc springs 15 in the axial direction in combination with the inner spacer 17a and which moves in the −X direction together with the shaft 14 while compressing the disc springs 15 when the spring cartridge 13 is compressed in the −X direction as opposed to the X direction, and a tubular limit sleeve 16 mounted between the inner spacer 17a and the outer spacer 17b with a specified space provide between the inner spacer 17a and the inner spacer 17b.

The limit sleeve 16 physically restrains the distance between the inner spacer 17a and the outer spacer 17b, thereby restraining the amount of axial displacement of the disc springs 15 resulting from the compression thereof.

On the other hand, when the displacement of the worm 12 reaches a predetermined amount, a contact of the torque switch 23 opens and stops current flow to the motor 11, thereby electrically restraining the rotation of the worm 12. The torque switch 23 is set to be actuated when the torque reaches a predetermined value and before the inner spacer 17a and the outer spacer 17b contact the limit sleeve 16.

The disc springs 15 elastically deform according to the Hooke's law. The disc springs 15 are placed between the inner spacer 17a and the outer spacer 17b compressed by the amount of pre-compression x0, and are under the preload F0 (=k·x0).

Under this condition, the outer spacer 17b, being in contact with a cover 19 fit to the casing 30, is restrained to move in the axially outward X direction, while the inner spacer 17a is restrained to move in the axially inward direction −X by the casing 30.

When the motor 11 is operated to move the valve disc 25 from its open position to its close position, the driving force from the motor 11 rotates the worm 12, which in turn rotates the gear 20 engaging the worm 12. When the gear 20 rotates by a predetermined angle, a projection 20a made on the gear 20 contacts and presses a projection 22a made on the drive sleeve 22.

When the drive sleeve 22 receives this pressing force (torque), it rotates together with the gear 20. This in turn rotates the stem nut 21 located within the drive sleeve 22.

Initially, there exists a gap between the leading flank of the stem nut 21 thread and that of the valve stem 24 thread. However, with the rotation of the stem nut 21, leading flanks of the stem nut 21 threads and those of the valve stem 24 threads come into contact with each other. As the stem nut 21 continues to rotate, the valve stem 24 descends in the direction shown by the arrow Y.

As the valve stem 24 further descends, the valve disc 25 is pressed downward to close the passage in the pipe 200.

Figure 9:
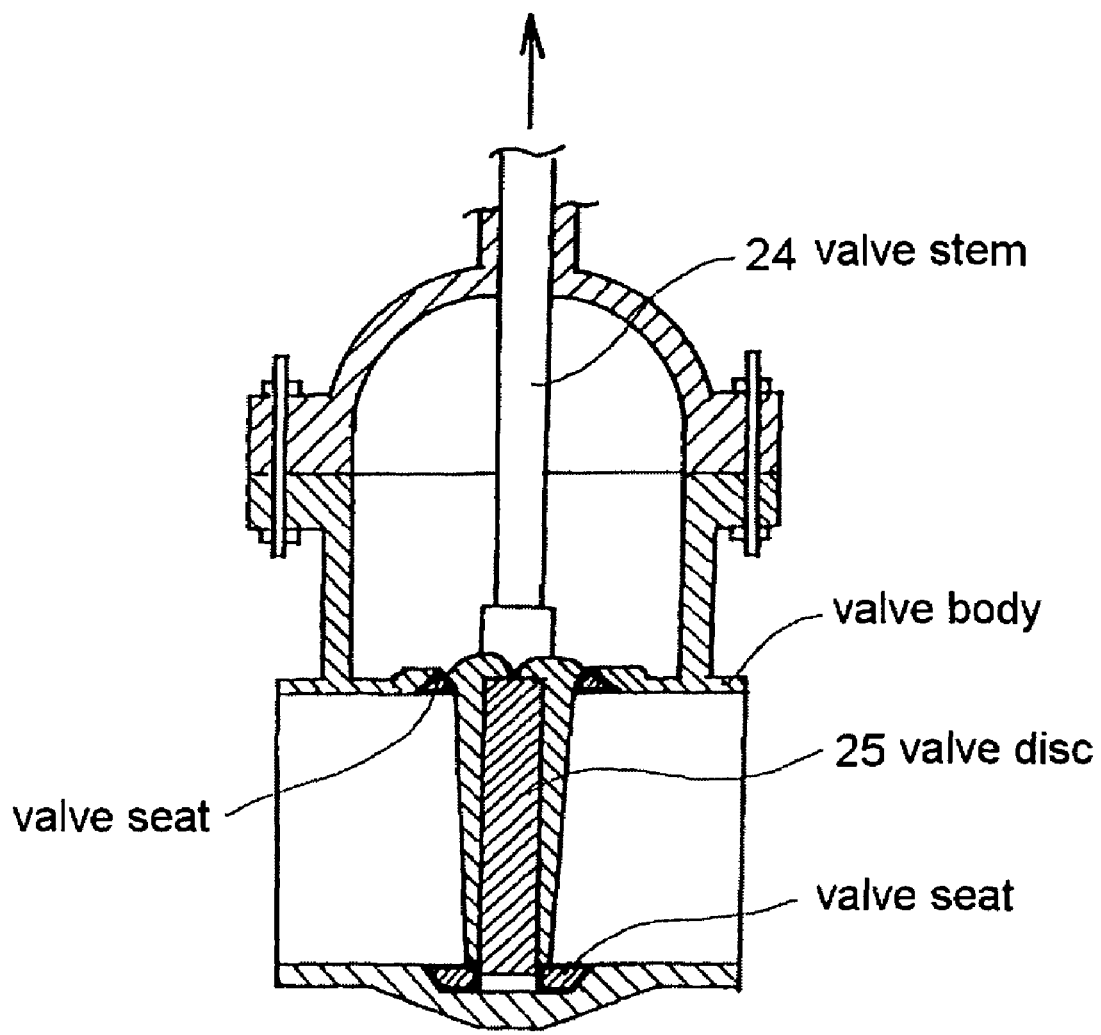
FIG. 9 is a schematic sectional view showing the valve disc of the motor-operated valve in contact with the valve seat in the valve body.

If Tk is an elapsed time from the reference time to a time when the valve disc 25 contacts the valve seat in the valve body (see FIG. 9), then the valve stem 24 receives reaction stress σ from the pipe 200 after Tk has elapsed.

Figure 4A:
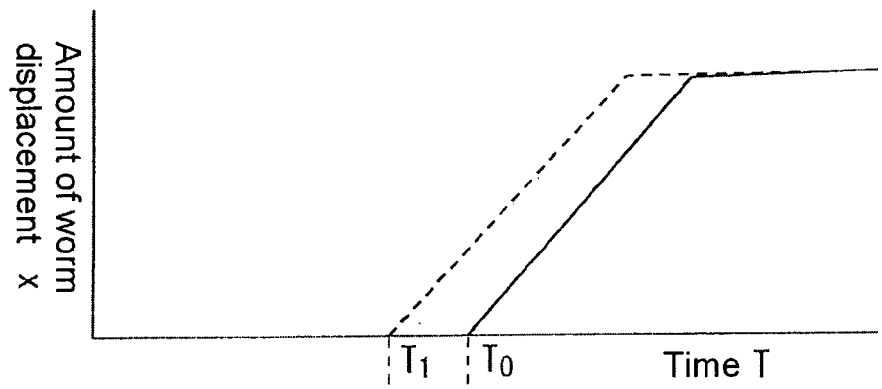
FIG. 4(*a*) is a graph showing a corresponding relation between the elapsed time T and the position x of the worm.
Figure 4B:
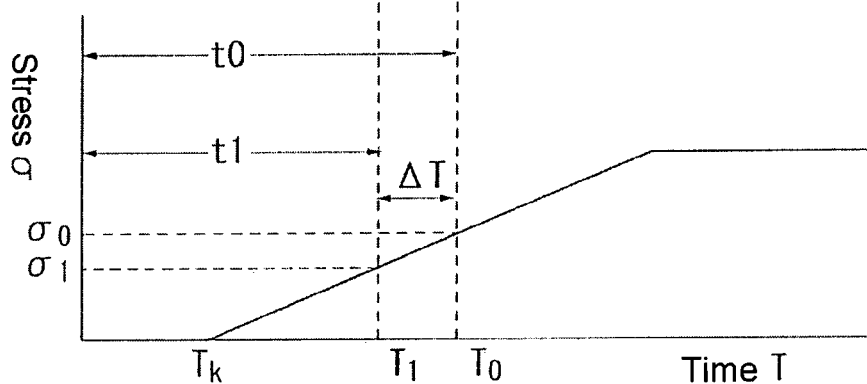

As shown in FIG. 4(b), the corresponding relation between the elapsed time Tk and the stress σ generated in the valve stem 24 is that the stress σ remains zero until the valve disc contacts the valve seat (in actuality, the valve stem receives stress from the worm reacting to the sliding resistance of a packing or others, but the stress σ may be regarded as zero until Tk has elapsed when standardized with all these stresses taken into account), and then increases with time T after the valve disc-to-seat contact, that is, after Tk has elapsed. The stress σ reaches maximum when the valve disc 25 is in the close position which corresponds to the worm position at which the torque switch 23 is actuated. After this time, the stress σ remains constant at the maximum.

The stress σ generated in the valve stem 24 is transmitted to and move the worm in the axial X direction according to a specific corresponding relation. However, the worm 12 is subjected to the preload F0 of the spring cartridge 13 acting in the −X direction as opposed to the axial X direction. Therefore, the worm 12 will not begin to move in the axial X direction until the stress σ generated in the valve stem 24 reaches a specific point of the corresponding relation between the stress σ and the preload F0.

FIG. 4 schematically explains these relations. As shown in FIG. 4(b), the stress acting on the valve stem 24 reaches σ0 when a given time T0 (time elapsed from the valve disc-to-seat contact (T0−Tk)) has elapsed from the reference time. When this stress σ0 corresponds to the preload F0 of the spring cartridge 13, the worm 12 begins to move in the X direction at this point (T=T0).

The corresponding relation between the displacement of the worm 12 and the elapsed time T is shown by the solid line in FIG. 4(a).

Figure 4C:
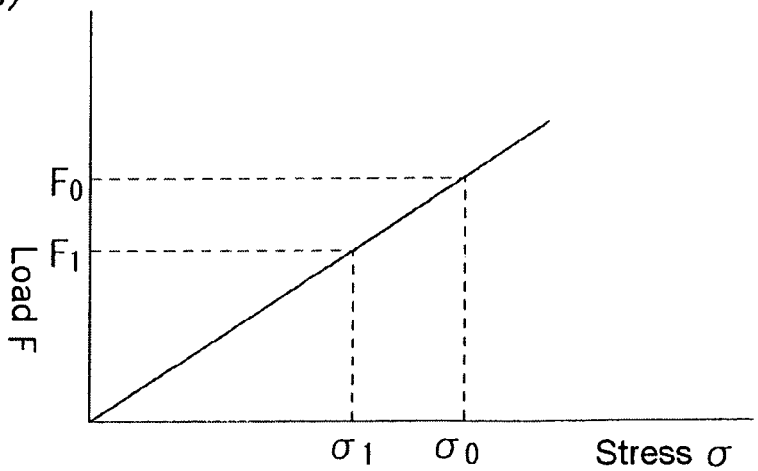

FIG. 4(c) shows the corresponding relation between the stress σ acting on the valve stem 24 and the load F applied to the worm 12. The load F applied on the worm when the stress σ acting on the valve stem 24 reaches σ0, that is, when the worm 12 begins to move, corresponds to the preload F0 of the spring cartridge 13.

Next, the motor-operated valve diagnostic apparatus 100 according to this embodiment is explained.

Figure 5:
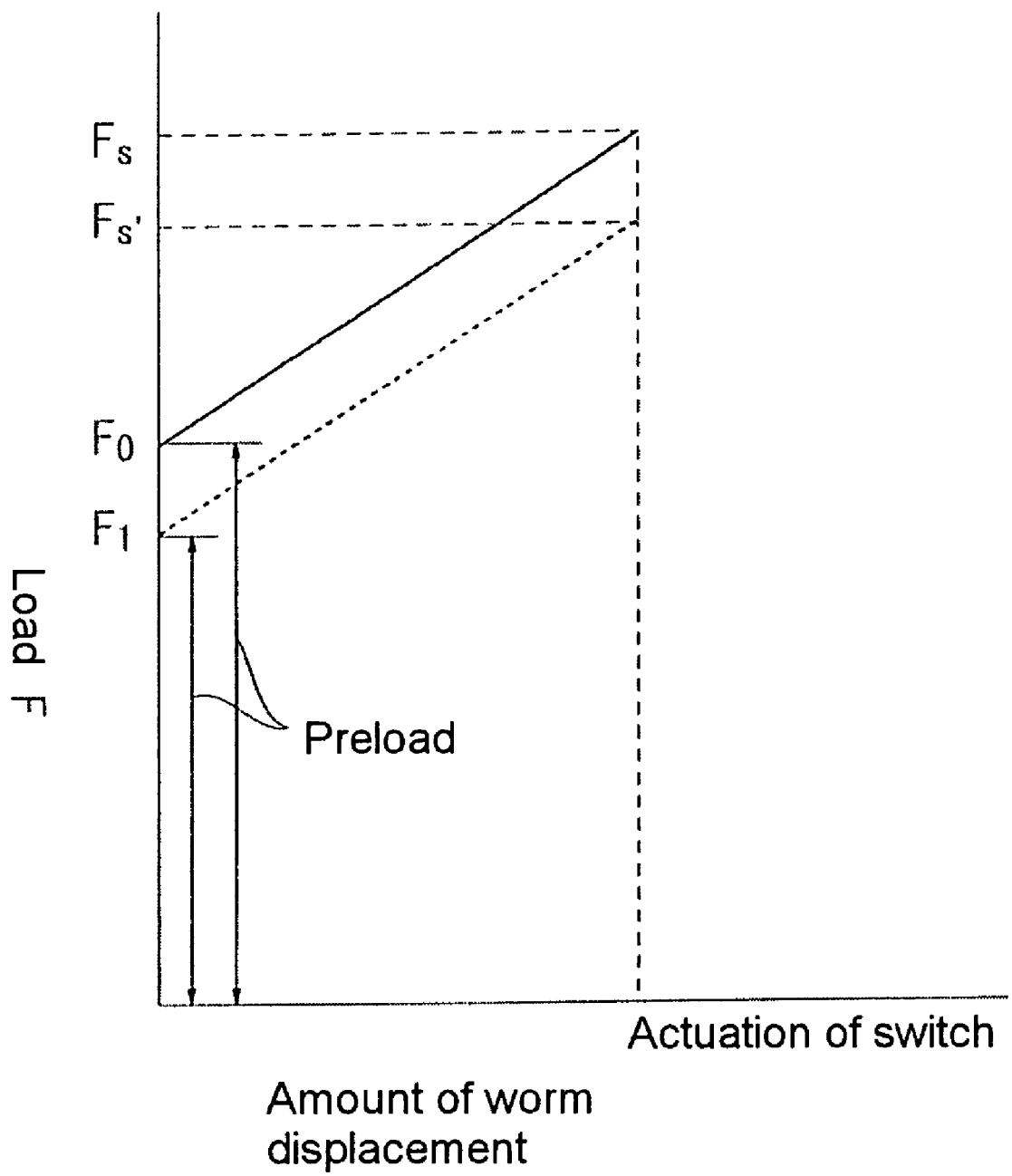
FIG. 5 is a graph showing a change in the torque curve.

FIG. 1 is a block diagram showing this embodiment of the motor-operated valve diagnostic apparatus 100. In this embodiment, a worm position sensor 50 (see FIG. 3(a)) is provided, replacing the cover 19 (see FIG. 3(c)) fit over the shaft outer end of the spring cartridge 13. The motor-operated valve diagnostic apparatus 100 in this embodiment comprises the worm position sensor 50, a stress sensor 60 (strain gauges, etc.), a diagnostic device 70, a monitor 81, and a printer 82. The worm position sensor 50 detects the axial position of the end surface 18 of the locknut 18 attached at the end of shaft 14, the shaft 14 moving integrally with the worm 12 in the axially outward in the X direction. The stress sensor 60 is mounted on the valve stem 24, which constitutes part of the link mechanism, for detecting the stress σ generated in the valve stem 24 in the axial direction Y. The diagnostic device 70 produces a diagnosis of the motor-operated valve 10 based on the torque curve of the spring cartridge 13 shown in FIG. 5, the torque curve being calibrated based on the preload F of the spring cartridge. This preload F is detected based on the stress σ detected by the stress sensor 60 at the time when the position of the end surface 18 of the locknut 18 monitored by the worm position sensor 50 changes. The monitor 81 displays the diagnostic results and data (preload, torque curve, etc.), while the printer 82 prints them.

The worm position sensor 50 comprises an adaptor 51 mounted in place of the cover 19 shown in FIG. 3(c) using the bolt holes used for fitting the cover 19, a stay 52 set upright on this adapter, and a laser sensor 53 fixed to the stay 52 and configured to detect a distance in the axial X direction to the end surface 18a of the locknut 18 located at the shaft end of spring cartridge 13.

An LVDT ("Linear Variable Differential Transformer") may be used in place of the laser sensor 53.

The adaptor 51 has almost the same fitting depth (insertion length) as the cover 19 has in the insertion hole of the casing 30 which houses the spring cartridge 13. The initial compression length (the amount of pre-compression) of the disc springs 15 is set to be the same whether it is the cover (FIG. 3(c)) or the adapter (FIG. 3(a)) that is fit to the valve.

The laser sensor 53 provides continuous and non-contact detection of the distance to the end surface 18a of the locknut 18, sampling at high speed. The distance detected is input into the diagnostic device 70.

The diagnostic device 70 is provided with a reference table (hereinafter referred to as the "LUT," short for "Look-up Table") of the corresponding relation shown in FIG. 4(c) between the stress σ and the load F. The load F is one (i.e., load acting on the spring cartridge) of the elements constituting the elastic characteristics of the spring cartridge 13. The diagnostic device 70 refers to the LUT 71 and detects the preload F of the spring cartridge 13 based on the stress σ at which the distance to the end surface 18a of the locknut 18 begins to change, that is, at which the worm 12 begins to move. The diagnostic device 70 then determines the torque curve shown in FIG. 5 based on the preload F thus detected.

The diagnostic device 70 produces a diagnosis on whether the torque-related characteristics of the motor-operated valve 10 are appropriate or not during continuous movement of the valve disc 25 from the full open to the full close position and vice versa, based on a change in the signals transmitted continuously from the worm position sensor 13 and the like.

Next, the function (motor-operated valve diagnostic method) of the motor-operated valve diagnostic apparatus 100 according to this embodiment is explained.

Current is flown to operate the motor 11, as aforementioned, so that the valve disc can be closed from the full open position.

The operation of motor 11 rotates the worm 12, which in turn rotates the gear 20 engaging the worm 12. When the gear 20 rotates by a predetermined angle, the projection 20a made on the gear 20 presses the projection 22a made on the drive sleeve 22 to rotate the drive sleeve 22.

The rotation of the gear 20 also rotates the stem nut 21 provided within the drive sleeve 22. When leading flanks of the stem nut 21 threads and those of the valve stem 24 threads are in contact with each other, the valve stem 24 descends as the stem nut 21 rotates. Consequently, the valve disc 25 descends to close the passage in the pipe 200.

During this time, inputs are coming into the diagnostic device 70 from the worm position sensor 50 and the stress sensor 60, the former providing the distance x to the end surface 18a of the locknut 18 and the latter providing the stress σ generated in the valve stem 24. The diagnostic device 70 detects a time when the distance x changes in response to the start of the spring cartridge 13 deformation, that is, a time when the worm 12 begins to move in response to the start of the spring cartridge 13 deformation. The diagnostic device 70 also detects the stress σ at the time thus detected, refers this detected stress σ to the LUT 71 (FIG. 4(c)), and calculates the preload F of the spring cartridge 13 at this specific time.

If the disc springs 15 are in their initial condition with no wear at all, the calculated preload F of the spring cartridge 13 is F0 as designed.

The diagnostic device 70 then determines the torque curve (the solid line in FIG. 5) stored therein based on this calculated preload F and makes a judgment that the torque curve need not be calibrated (i.e., the spring cartridge 13 is sound). Then, based on this torque curve, the diagnostic device 70 produces a diagnosis on whether the torque-related characteristics of the motor-operated valve 10 are appropriate or not. The diagnostic results are output in the monitor 81 or the printer 82 for each of the predefined diagnostic items.

Together with the diagnostic results, the diagnostic data may be displayed in the monitor 81 and printed out by the printer 82. These data may include Tk, which is the elapsed time elapsed from the reference time to the time when stress is generated in the valve stem 24 or in the yoke 31, and T0, which is the elapsed time from the reference time to the starting time of the worm 12 displacement, the reference time being the time when a specified point on the valve stem 24 passes a specified position. The data may also include stress σ detected by the stress sensor 60 at the starting time of the worm 12 displacement and the calculated preload F0.

Further, other information such as acceptance criteria which justify or support the diagnostic results may also be output. Outputting information such as acceptance criteria will help the user understand the diagnosis results and others, making the diagnostic apparatus user-friendly.

The laser sensor 53 measures the distance to the end surface 18a of the locknut 18. If the absolute position of the end surface 18a of the locknut 18 is the distance Lx from the reference surface Z, which is the end surface of the casing 30 of the motor-operated valve 10 (see FIG. 3), the distance Lx has the following relation with the distance La and the distance Lb: La+Lb=Lx+L (L is a value measured by the laser sensor 53). In this expression, the distance La is the distance between the reference surface Z and the end surface of adapter 51, while the distance Lb is the distance from the end surface of adapter 51 to the laser sensor 53. Thus, the absolute position Lx of the end surface 18a of the locknut 18 relative to the reference surface Z is given by:

$Lx=La+Lb-L.$

La and Lb may be actually measured using vernier calipers or the like. Thus, with the use of the distance Lx as the absolute position, even if a packing or the like, which may be subject to an error in thickness compared to the adapter 51, is placed between the reference surface Z and the adapter 51, the absolute position Lx can be determined by actually measuring La including a possible error in the packing thickness.

The cover 19 has heretofore been replaced with an externally-attached LVDT at every measurement. In this case, the cover 19 has been put back after the measurement is complete. Because of this, measurement with an LVDT has not always been made under the same conditions as those during the operation of the motor-operated valve. On the other hand, in the motor-operated valve diagnostic apparatus of this embodiment, the adaptor 51 replaces the cover 19 and is permanently provided to the motor-operated valve 10. The adaptor 51 has the laser sensor 53 attached. Consequently, the spring cartridge 13 is always set at the same position in relation to the adapter 51 at every measurement.

The absolute position of the end surface 18a of the locknut 18 relative to the reference surface can be calculated using the aforementioned formula and the relative position of the end face 18a of the locknut 18 to the laser sensor 53. Therefore, based on the absolute position thus calculated, a change in the position at which the worm begins to move at each measurement can be monitored.

Accordingly, even in cases where the cover 19 and the adapter 51 have different insertion lengths or where the adapter 51 is changed with another adapter 51 having a different insertion length, it is possible to correct these differences by referring to the absolute position. Thus, the torque curve of the spring cartridge 13 can still be calibrated with high accuracy.

Next, explanation is made in regard to a situation in which the disc springs 15 are worn.

Even with the disc springs 15 worn, the locknut 18 restrains the inner spacer 17a and the outer spacer 17b. Therefore, under no-load conditions, the distance between the inner spacer 17a and the outer spacer 17b remains the same whether the disc springs 15 are worn or not.

However, with the disc springs 15 worn, their length is now closer to their free length by the amount corresponding to the wear. Consequently, the preload F of the disc springs under this condition is at F1 which is smaller than the initial preload F0 before the wear occurred (F1<F0).

This will make the worm 12 begin to move in the axial X direction with a smaller load acting thereon from the valve stem 24 than the initial load applied before the wear occurred (refer to the dotted line in FIG. 4(a)).

The diagnostic device 70 detects a change in the value of distance being input by the worm position sensor 50, and also detects the stress σ1 input by the stress sensor 60 at the time (T=T1) when the worm 12 begins to move.

The diagnostic device 70 then calculates the load F1 corresponding to the stress σ1 by referring to the LUT 71.

The calculated load F1 is equal to the preload of the spring cartridge 13 at this specific moment. Accordingly, the diagnostic device 70 calibrates the torque curve shown by a solid line in FIG. 5 (before wear) to a dotted line of FIG. 5 based on the preload F1.

This calibration assumes that the spring constant of the disc springs 15 remains unchanged from the one before the wear occurred (constant stiffness).

Using the calibrated torque curve and signals transmitted from the worm position sensor and the like as the valve disc 25 is closed or opened, a diagnosis is produced on whether the torque-related characteristics (i.e., the integrity) of the motor-operated valve 10 are appropriate or not. The diagnostic results and other information are output in the monitor 81 and by the printer 82.

In the embodiment explained above, regardless whether or not the disc springs 15 have worn or whether or not the preload F has changed, the torque switch 23 is actuated to stop the flow of operating current to the motor 11, when the worm 12 has moved by a given distance. This means that if the preload F1 is lower than the preset value, the torque switch 23 is actuated prematurely before the valve disc 25 reaches a given close position. When this happens, the motor stops automatically, obstructing a proper closing of the valve disc 25.

Thus, to determine the integrity of the motor-operated valve 10 based on the preload F1, the load Fs acting on the torque switch 23 is obtained from the calibrated torque curve (dotted line in FIG. 5) and is compared to a given reference value. Judgment is then made on whether the load acting on the torque switch 23 is appropriate or not.

As explained, in accordance with the motor-operated valve diagnostic apparatus 100 and diagnostic method according to this embodiment, it is not necessary to install a large load cell or the like to directly measure load acting on the spring cartridge 13; nor is it necessary to remove the spring cartridge 13 for taking measurement thereon. Instead, it is only the worm position sensor 50 and the stress sensor 60, both small-sized and simple, that are installed on the motor-operated valve 10. And with the use of these sensors, a diagnosis can be achieved on the motor-operated valve 10 during its actual operation at low costs with high accuracy.

Furthermore, the diagnosis can be made not only during outage of a nuclear power plant but also during operation. This permits inspection activities which tend to concentrate in an outage period to be spread out.

Still further, because of their small size, the sensors 50 and 60 do not interfere with normal operation of the motor-operated valve 10 when installed thereon. Thus, it is possible to permanently install these sensors on the motor-operated valve and monitor the integrity thereof at all times.

The motor-operated valve diagnostic apparatus 100 in this embodiment has the stress sensor 60 attached to the valve stem 24. Stress acting on the valve stem 24 generates reaction force in the yoke 31, which is part of the casing 30 covering the valve stem 24. This reaction force in the yoke 31 has a certain corresponding relation with the stress acting on the valve stem 24.

Therefore, a corresponding relationship also exists between the reaction force acting on the yoke 31 and the load acting on the worm 12. Thus, the stress sensor 60 may be provided on the yoke 31 instead of on the valve stem 24 to detect the stress acting on the yoke 31 instead of the stress generated in the valve stem 24. This configuration produces similar actions and effects to those by the motor-operated valve 100 of this embodiment.

In an embodiment where the stress sensor 60 is provided on the yoke 31, the information contained in the LUT 71 may be changed to a corresponding relation between the stress acting on the yoke 31 and the load acting on the worm 12.

Installation of the stress sensor 60 to the yoke 31 means that the stress sensor 60 is located on the outer surface of the motor-operated valve 10. Thus it is simpler and more preferable than its installation on the valve stem 24.

In this embodiment, the laser sensor 53 detects the distance to the end surface 18a of the locknut 18 by emitting a laser beam to the surface 18a and detecting light reflected therefrom. The motor-operated valve diagnostic apparatus of the invention is not limited to this embodiment. Instead, a simpler position sensor may be used. Or, a position other than the end surface 18a of the locknut 18 may be selected for detection, as long as it is possible to detect the axial displacement of the worm 12 in the X direction.

The motor-operated valve diagnostic apparatus 100 and method according to the present embodiment assumes that the spring constant of the spring cartridge (the disc spring 15) remains unchanged whether the disc springs are worn or not.

In other words, the amount of wear of the disc springs 15 in the axial X direction is treated as a change in the amount of pre-compression, under the assumption that the spring constant does not change.

This is because the amount of wear of the disc springs 15 is normally small enough not to affect the spring constant of the disc spring 15.

Notwithstanding the above, the spring constant may change as the disc springs age. Also, an extremely large amount of wear could affect the spring constant.

However, the spring constant changes quite slowly compared with wear. It is thus considered acceptable to examine the spring constant at intervals several times longer than those of periodic inspection of the motor-operated valve carried out during plant outage.

Figure 6:
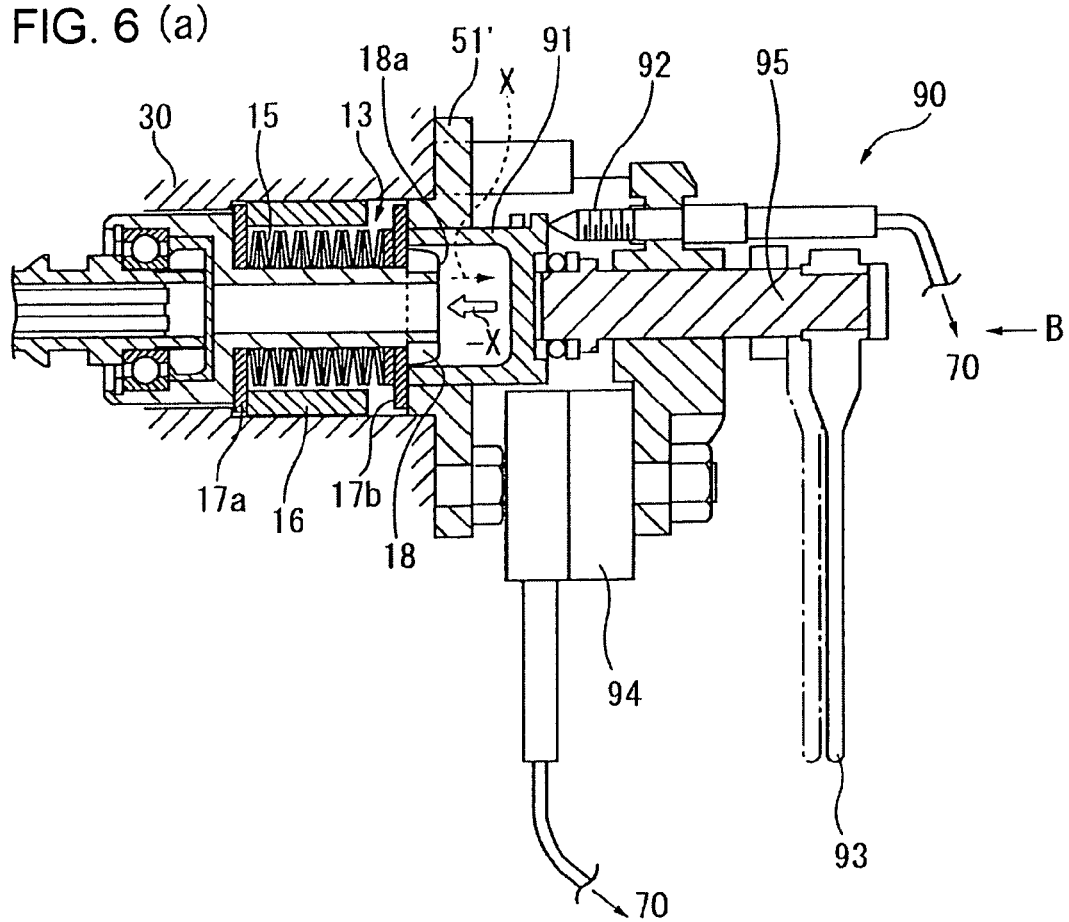
FIG. 6 is a sectional view showing a spring pressing device to be installed temporarily on the motor-operated valve.
Figure 6:
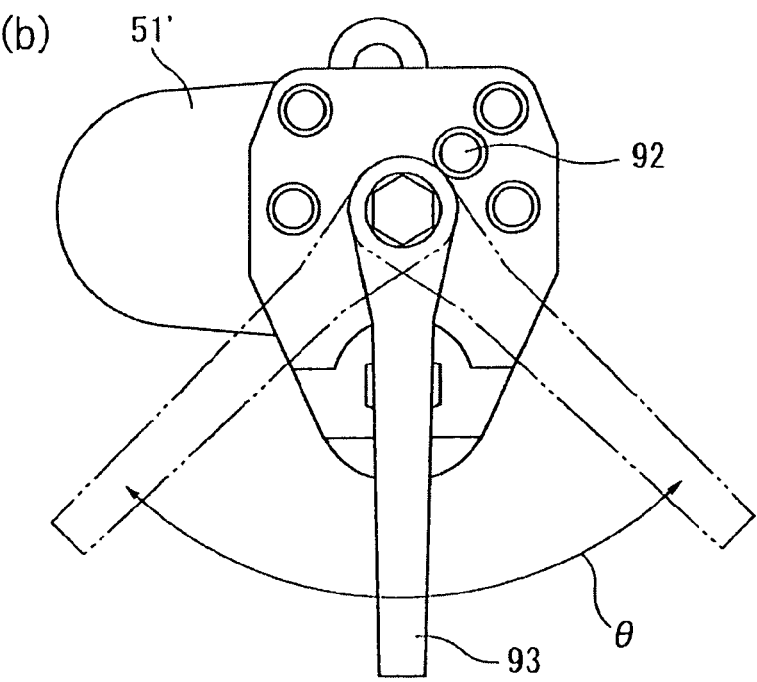

To examine the spring constant, a spring pressing device 90 shown in FIG. 6 may be additionally provided to the motor-operated valve diagnostic apparatus 100 of the present embodiment so that elastic characteristics (preload, spring constant, etc) of the spring cartridge 13 can be calibrated.

The spring pressing device 90 is temporarily installed with the use of an adaptor 51', the adapter being placed between the spring pressing device 90 and the motor-operated valve, replacing the cover 19 covering the spring cartridge. The spring pressing device 90 comprises the adaptor 51', a contact support 91 contacting the outer spacer 17b, a linear gauge 92 (a stroke sensor, a displacement sensor) contacting the contact support 91 in the axial direction of the worm 12 and detecting an axial displacement x of the contact support 91 following the contact support 91 as it moves axially, a pressing screw 95 pressing the contact support in the direction which presses the disc springs 15 in the axially opposite −X direction, a pressing handle 93 displacing the pressing screw 95 in the −X direction when rotated by an angle θ (see FIG. 6(b)), and a load cell 94 detecting load with which the pressing screw presses the contact support 91, that is, the load F compressing the disc springs 15 in the −X direction.

The displacement x of the contact support 91 detected by the linear gauge 92 and the load F detected by the load cell 94 are input into the diagnostic device 70. The diagnostic device 70 then calibrates the preload of the spring cartridge 13 based on these inputs of the displacement x and the load F. It also calculates and calibrates the spring constant k (in the direction of compression) according to the formula $k=F/x$.

If a hysteresis exists in the elastic characteristics of the spring cartridge 13 between the valve disc closing movement from the full open position and the valve disc opening movement from the full close position, the spring pressing device 90 added with the function of an externally-attached torque sensor determines the elastic characteristics of the spring cartridge, by means of the spring pressing device as described above, for the valve opening movement from the full close position (i.e., for the −X direction of the worm 12). Those for the valve closing movement from the full open position (i.e., for the X direction of the worm 12) are determined using the function of the externally-attached torque sensor of the pressing device 90, with the motor-operated valve in operation. Thus, the elastic characteristics of the spring cartridge 13 can be determined with high accuracy separately for the valve opening and closing movements.

In other words, the spring pressing device 90 added with the function of an externally-attached torque sensor is adapted in such a way that the linear gauge 92 can detect the displacement of the end surface 18a of the locknut 18 which moves independently of the compression plate 17b in the X direction, and that the load cell 94 can detect the load pressing the compression plate 17b in the X direction as the locknut 18 moves in the X direction. Thus, the elastic characteristics of the spring cartridge for the valve closing movement can be detected as well. This means that the elastic characteristics of the spring cartridge for the valve closing and opening movements can be determined separately with high accuracy.

Still further, by adding the function of an externally-attached torque sensor to the spring pressing device, it is possible to reduce not only the frequency of mounting and dismounting equipment on and from the motor-operated valve but also the number of component parts to be used, as compared to separate provision of an externally-attached torque sensor and a spring pressing device. It is further possible to determine the elastic characteristics of the spring cartridge efficiently for both the valve disc opening and closing movements.

The preload and the spring constant k thus calibrated are stored in the memory (not shown in any of the Figures) or the like of the diagnostic device 70 and used for calibrating the LUT 71 or for others.

The motor-operated valve diagnostic apparatus 100 temporarily provided with the spring pressing device 90 permits calibration of the preload and the spring constant k of the spring cartridge 13 for verification purpose as mentioned above. Thus, even if the elastic characteristics of the spring cartridge 13 such as the spring constant change, the diagnostic device 70 calibrates the LUT 71 according to the change in the elastic characteristics, thereby properly calibrating the torque curve. This calibration with the spring pressing device 90 may be performed during extensive maintenance of the motor-operated valve 10, for example, during periodic inspection thereof. This way, a diagnosis with enhanced accuracy can be achieved.

The spring pressing device 90 may be replaced by an externally-attached torque sensor or a spring cartridge calibrator.

The spring pressing device 90, an externally-attached torque sensor, or a spring cartridge calibrator may also be used to measure the initial preload and spring constant k of the spring cartridge 13 before wear occurs.

The adaptor 51' for the spring pressing device 90 may be used as the adaptor 51 for the worm position sensor 50, or vice versa. This reduces the number of component parts, and consequently, production costs.

EMBODIMENT 2

Figure 7:
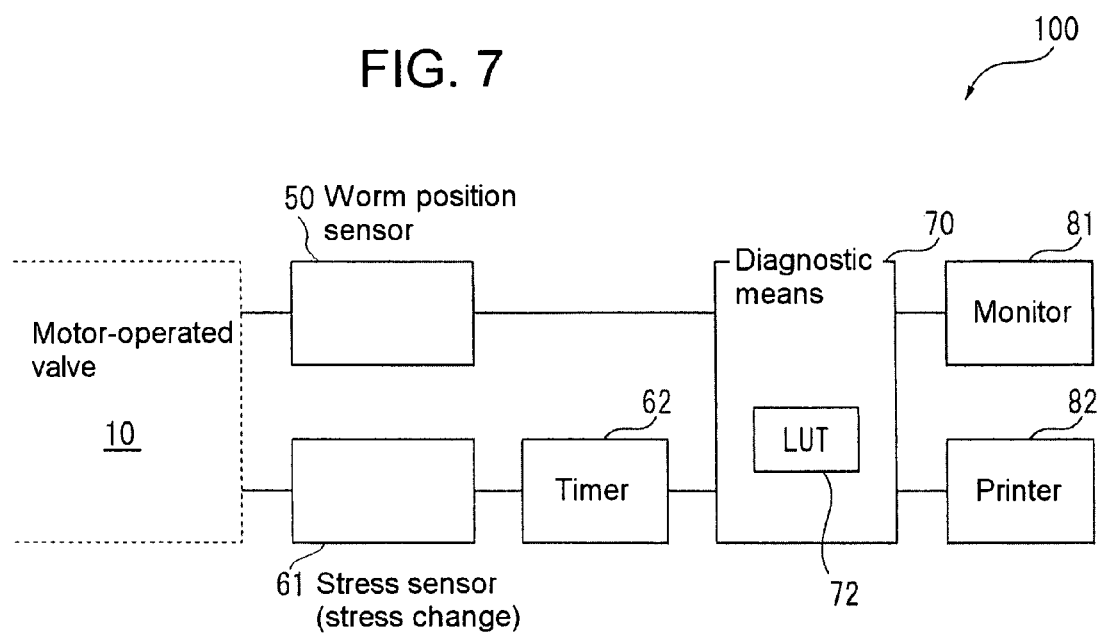
FIG. 7 is a block diagram showing another embodiment of the motor-operated valve diagnostic apparatus for practicing the motor-operated valve diagnostic method of this invention.

FIG. 7 is a block diagram showing another embodiment of the motor-operated valve diagnostic apparatus and method according to the invention.

The motor-operated valve diagnostic apparatus 100 shown in FIG. 7 is constructed exactly the same way as the motor-operated valve diagnostic apparatus 100 of Embodiment 1 shown in FIG. 1 except the following points. That is, the motor-operated valve diagnostic apparatus 100 comprises a stress sensor 61 which replaces the stress sensor 60 of the motor-operated valve diagnostic apparatus of Embodiment 1 shown in FIG. 1, the stress sensor 61 detecting the time when the valve disc 25 contacts the valve seat. The apparatus also has a timer 62 which measures an elapsed time t1 elapsed from the time Tk detected by the stress sensor 61 when the valve disc 25 contacts the valve seat to the time T1 when the displacement of the worm 12 in the X direction starts, the starting time of the worm 12 displacement corresponding to the starting time of the spring cartridge 13 deformation. Further, the diagnostic device 70 of Embodiment 2 detects the preload F1 of the spring cartridge 13 based on the time difference $\Delta T$ (=t0−t1) between the predefined reference elapsed time t0 and the elapsed time t1 measured by the timer 62 and then diagnoses the motor-operated valve 10 based on the preload F1 thus detected.

The predefined reference elapsed time t0 means, for example, the time elapsed from Tk when the valve contacted the valve seat with no wear on the disc springs 15, that is, with the preload F at its initial set value, to the time T0 when the worm begins to move, as shown in FIG. 4.

The time difference $\Delta T$ between the reference elapsed time T0 before wear of the disc springs 15 and the elapsed time T1 after wear has a corresponding relation with the change $\Delta x$ (i.e., amount of wear) in the pre-compression amount x0

Figure 8:
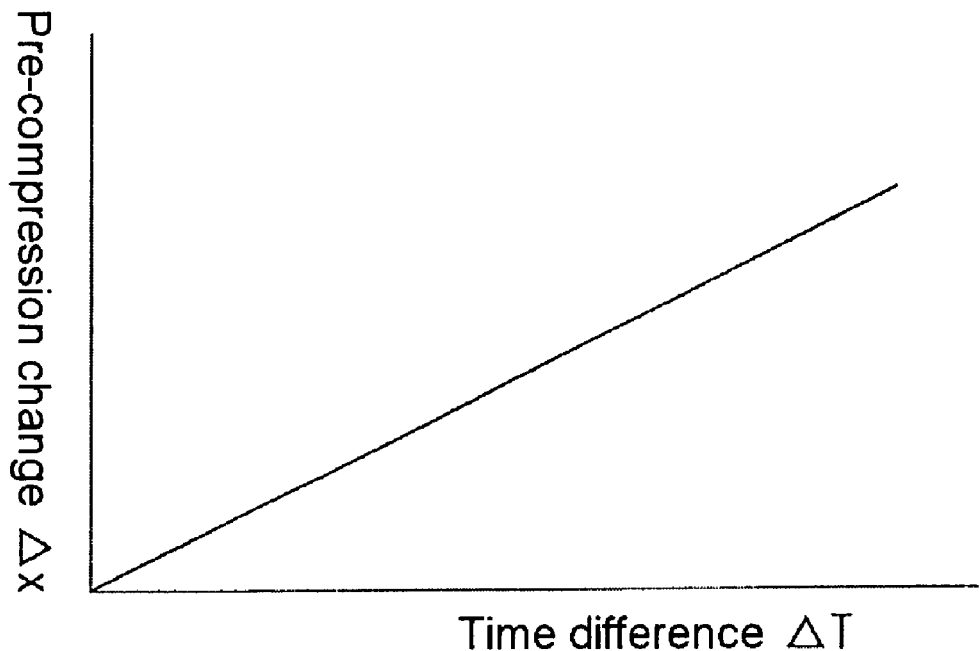
FIG. 8(*a*) is a graph showing a corresponding relation between the time difference ΔT and the change Δx in the amount of pre-compression, ΔT being a difference in time duration between the reference elapsed time T0 before wear occurs on the disc springs and the elapsed time T after wear has occurred, and Δx being the change in the amount of pre-compression of the disc springs 15, namely, the amount of wear.
Figure 8:
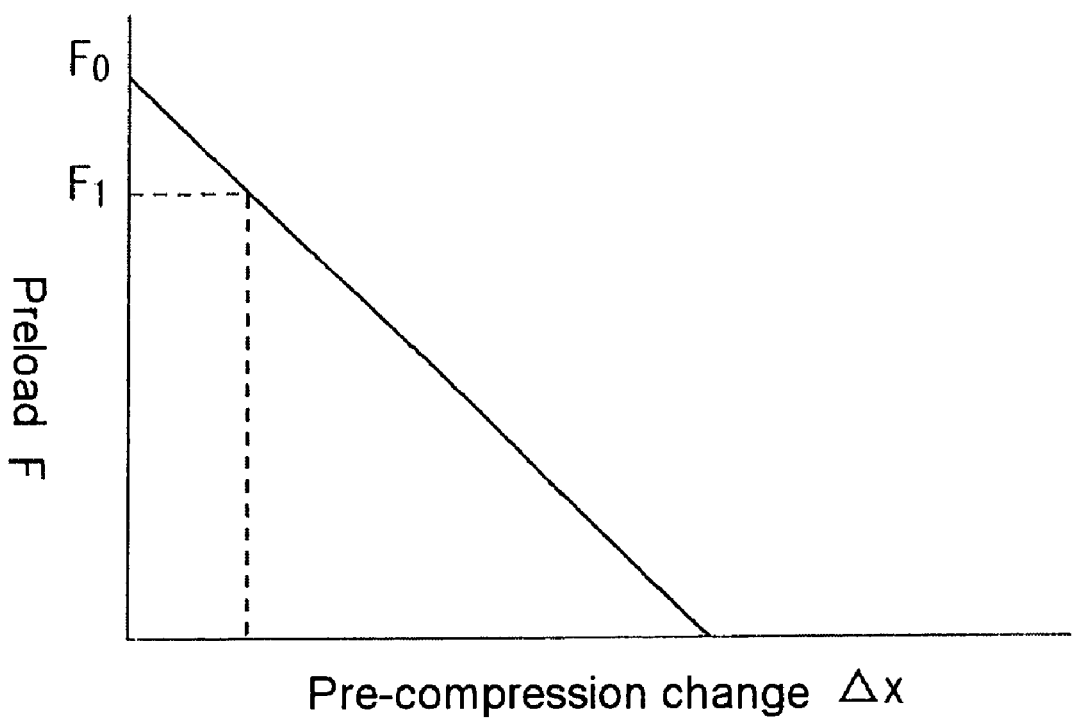

(amount of compression from the free length) of the disc springs 15 as shown in FIG. 8(*a*), provided that the energy (rotational driving force) driving the worm 12 is constant.

Further, the change Δx in the pre-compression amount of the disc springs 15 has a corresponding relation with the preload F of the spring cartridge 13 as shown in FIG. 8(*b*).

Therefore, by loading the LUT 72 of the diagnostic device 70 with these corresponding relations, the diagnostic device 70 can refer to the LUT 72 and detect the elastic characteristics of the spring cartridge 13 such as the preload based on the time difference ΔT. The detected preload F1 is then used to calibrate the torque curve shown in FIG. 5 from the solid line to the dotted line.

Then, judgment is made on whether the torque-related characteristics of the motor-operated valve 10 (i.e., integrity of the valve) are appropriate or not using the calibrated torque curve (dotted line) as well as signals from the worm position sensor and the like obtained during the opening and closing of the valve disc 25. In this judgment, the load Fs actuating the torque switch 23, which is obtained from the calibrated torque curve (dotted line), is compared to the predetermined reference value. Accordingly, determination is made whether the load actuating the torque switch 23 is appropriate or not.

As explained, in accordance with the motor-operated valve diagnostic apparatus 100 and diagnostic method according to Embodiment 2, it is not necessary to install a large load cell or the like to directly measure load acting on the spring cartridge 13; nor is it necessary to remove the spring cartridge 13 for taking measurement thereon. Further, there is no need to install the stress sensor 60 for detecting stress. Instead, it is only the worm position sensor 50, the stress sensor 61 which detects only the reference time and which is even simpler than the one in Embodiment 1, and the timer 62 that are installed on the motor-operated valve 10. And with the use of these sensors and the timer, a diagnosis can be achieved on the motor-operated valve 10 during its actual operation at low costs with high accuracy.

Still further, the diagnosis can be made not only during outage of a nuclear power plant but also during operation. This permits inspection activities which tend to concentrate in an outage period to be spread out.

In this embodiment, the given reference time is defined as the time of the valve disc 25-to-seat contact detected by the stress sensor 61. Notwithstanding this, in the motor-operated valve diagnostic apparatus and method of this invention, the reference time is not limited to the time of the valve disc 25-to-seat contact.

That is, the given reference time may be a time by which indirect detection of the time of the valve disc 25-to-seat contact can be made and the elapsed time to which corresponds to the elapsed time to the time of the valve disc-to-seat contact. For example, the point in time when a specified point on the valve stem passes a specified position of the casing 30 may be taken as the given reference time, provided that the valve stem 24 descends and rises at a constant rate at all times.

This is because of the following. Of the elapsed time between the given reference time and the starting time of the worm 12 axial displacement, the elapsed time Tk elapsed from the given reference time to the time when the valve disc 25 contacts the seat remains constant whether the disc springs 15 are worn or not. Therefore, the difference ΔT (=T0−T1) between the reference elapsed time T0 (=Tk+t0) from the reference time to the starting time of the worm displacement before wear and the elapsed time T1 (=Tk+t1) after wear, after all, is equal to the difference ΔT (=t0−t1) between the elapsed reference time t0 from the valve disc-to-seat contact to the start of the worm displacement before wear and the elapsed time t1 after wear.

In order to detect that the specified position on the valve stem 24 has passed the specified position of the casing 30, a position sensor or the like that can detect this action of passing the specified position may replace the stress sensor 61.

In the motor-operated valve diagnostic apparatus 100 of this embodiment, it is readily understood that the timer 62 may be provided as an integrated part of the diagnostic device 70.

The motor-operated valve diagnostic apparatus and method of both embodiments described above has been explained only with reference to the closing operation of the motor-operated valve 10; however, similar actions and effects apply to the valve opening operation as well.

That is, when the valve is opening, the motor 11, the worm 12, the drive sleeve 22, and the stem nut 21 are rotated in a direction reverse to that of the closing operation. Consequently, the valve stem 24 rises, and then the valve disc 25 opens, contacts a specific stopper not shown in any of the Figures, and subsequently remains in a predetermined open position.

In this case, reaction force begins to act on the link mechanism from the time of the valve disc-to-seat contact applicable to the valve opening operation. When this reaction force exceeds a specified value, the worm 12 begins to move in the axially opposite −X direction.

At this moment, the shaft 14 of the spring cartridge 13 also moves in the axially opposite −X direction integrally with the worm 12. The outer spacer 17*b* also moves in the direction −X together with the locknut 18 provided at the end of shaft 14.

On the other hand, the inner spacer 17*a* is restrained to move in the −X direction. Accordingly, the worm displacement in the −X direction results in the compression of the spring cartridge 13. When the compression load on the spring cartridge 13 exceeds the preload, the worm 12 begins to move corresponding to the starting time of the spring cartridge deformation.

EFFECTS OF THE INVENTION

As explained in detail, the motor-operated valve diagnostic method and apparatus of the invention allows an easy and quick diagnosis to be made on whether the torque-related characteristics of a motor-operated valve are appropriate or not. In addition, highly accurate and low cost diagnosis is possible during actual operation of a motor-operated valve.

What is claimed is:

1. A motor-operated valve diagnostic method for diagnosing a motor-operated valve comprising a valve disc for opening and closing a given passage, a worm rotatably driven by motor power, a link mechanism which opens and closes the valve disc with the rotational driving force transmitted from the worm, and a spring cartridge containing disc springs which expand or compress in response to reaction force acting axially on the worm from the link mechanism, said method comprising:

calibrating a torque curve representing elastic characteristics of the spring cartridge based on a load including at least a preload of the spring cartridge, diagnosing the motor-operated valve based on the torque curve thus calibrated, detecting a condition of compression of the spring cartridge resulting from the reaction force as axial displacement of the worm, detecting a given physical quantity corresponding to the preload of the spring cartridge, and detecting the preload of the spring cartridge based on the given physical quantity.

2. The motor-operated valve diagnostic method as claimed in claim 1, wherein said given physical quantity is a stress acting on the link mechanism or a reaction stress generated in an area subjected to the stress acting on the link mechanism when the spring cartridge is under the specific compression condition, said method further comprising:

determining a relationship between the stress or reaction stress and the load acting on the spring cartridge, and detecting the preload of the spring cartridge from the stress or reaction stress based on said relationship.

3. The motor-operated valve diagnostic method as claimed in claim 1, wherein the preload is detected as a stress acting on a yoke covering the link mechanism.

4. The motor-operated valve diagnostic method as claimed in claim 1, wherein said given physical quantity is elapsed time between a given reference time point and a time point at which the worm starts displacement, and wherein the preload is detected from elapsed time, based on a relationship between a load acting on the spring cartridge and elapsed time.

5. The motor-operated valve diagnostic method as claimed in claim 4, wherein the given passage is closed by engagement of the valve disc with a valve seat, and wherein said given reference time point is a time point at which the valve disc comes into contact with the valve seat.

6. The motor-operated valve diagnostic method as claimed in claim 5, wherein the reference time point at which the valve disc comes into contact with the valve seat is detected based on a change in stress acting on the link mechanism or a change in reaction stress generated in an area subjected to the stress acting on the link mechanism, said area including a yoke covering the link mechanism, the spring cartridge, or a part where a stress applied thereto changes integrally with that in the spring cartridge.

7. The motor-operated valve diagnostic method as claimed in claim 1, wherein the preload is detected based on a stress acting on a yoke covering the link mechanism.

8. The motor-operated valve diagnostic method as claimed in claim 2, wherein the preload is detected based on a stress acting on a yoke covering the link mechanism.

9. A motor-operated valve diagnostic apparatus for diagnosing a motor-operated valve comprising a valve disc for opening and closing a given passage, a worm rotatably driven by a motor, a link mechanism which opens and closes the valve disc with rotational driving force transmitted from the worm, and a spring cartridge containing disc springs which expand or compress in response to reaction force acting axially on the worm from the link mechanism, said diagnostic apparatus comprising:

diagnostic means for calibrating a torque curve representing elastic characteristics of the spring cartridge based on at least a preload of the spring cartridge and for producing a diagnosis of the motor-operated valve based on the calibrated torque curve, a worm position sensor for detecting a condition of compression of the spring cartridge, which results from the reaction force, as a worm axial displacement, and a stress sensor for detecting stress acting on the link mechanism or reaction stress generated in an area subjected to the stress acting on the link mechanism, and wherein said diagnostic means detects a load corresponding to the preload of the spring cartridge based on the stress detected by the stress sensor when the spring cartridge is under compression, including at least compression at the time the spring cartridge starts deforming, as detected by the worm position sensor.

10. The motor-operated valve diagnostic apparatus as claimed in claim 9, wherein the stress sensor detects the reaction stress generated in a yoke covering the spring cartridge.

11. The motor-operated valve diagnostic apparatus as claimed in claim 9, wherein the worm position sensor further detects a time point at which the spring cartridge starts deforming, caused by compression thereof resulting from the reaction force, as a starting time of the worm axial displacement, and a timer for measuring an elapsed time between a given reference time and the starting time of the spring cartridge deformation, wherein said diagnostic means detects the preload of the spring cartridge based on the elapsed time measured by the timer.

12. The motor-operated valve diagnostic apparatus as claimed in claim 11, wherein the given passage is closed by engagement of the valve disc with a valve seat, wherein the given reference time is a time point at which the valve disc is brought into contact with the valve seat, and wherein the stress sensor detects the given reference time based on a change in stress acting on the link mechanism or a change in reaction stress generated in an area subjected to the stress acting on the link mechanism, said area including a yoke covering the link mechanism, the spring cartridge, or a part where a stress applied thereto changes integrally with that in the spring cartridge.

13. The motor-operated valve diagnostic apparatus as claimed in claim 9, further comprising an output device for outputting acceptance criteria relating to the diagnostic results or for the diagnostic data together with the diagnostic results and/or diagnostic data.

14. The motor-operated valve diagnostic apparatus as claimed in claim 9, wherein the worm position sensor is mounted on the motor-operated valve with the use of an adapter, the adapter being placed between the worm position sensor and the motor-operated valve and substituted for a cover covering the spring cartridge, the adapter having an insertion length almost identical to that of the cover.

15. The motor-operated valve diagnostic apparatus as claimed in claim 14, wherein the stress sensor detects the reaction stress generated in a yoke covering the spring cartridge.

16. The motor-operated valve diagnostic apparatus as claimed in claim 14, wherein the worm position sensor comprises a laser sensor which detects the position of an object by irradiating a laser beam onto the object and detecting light reflected therefrom, wherein the object is an axial edge of the spring cartridge which is axially displaced together with said worm or a part connected to the axial edge for movement therewith.

17. The motor-operated valve diagnostic apparatus as claimed in claim 9, wherein the stress sensor detects the reaction stress generated in a yoke covering the spring cartridge.

18. A motor-operated valve diagnostic method for diagnosing a motor-operated valve comprising a valve disc for opening and closing a given passage, a worm rotatably driven by motor power, a link mechanism which opens and closes the valve disc with rotational driving force transmitted from the worm, and a spring cartridge containing disc springs which expand or compress in response to reaction force, acting axially on the worm from the link mechanism said method comprising:

calibrating a torque curve representing elastic characteristics of the spring cartridge with a spring pressing device mounted on the motor-operated valve, the spring pressing device pressing the disc springs axially within the spring cartridge while measuring a relationship between a pressing force applied to the disc springs and a displacement of the disc springs, and diagnosing the motor-operated valve based on the calibrated torque curve.

19. The motor-operated valve diagnostic method as claimed in claim 18, wherein the valve disc is moveable between a full open position and a full closed position, wherein the elastic characteristics of the spring cartridge show a hysteresis between when the valve disc moves from the full open position toward the full closed position and when the valve disc moves from the full closed position toward the full open position, and wherein the elastic characteristics of the spring cartridge for the valve disc opening movement from the full closed position toward the full open position are determined by means of the spring pressing device without the motor-operated valve in operation, while the elastic characteristics of the spring cartridge for the valve disc closing movement from the full open position are determined by the spring pressing device with the motor-operated valve in operation.

20. A motor-operated valve diagnostic apparatus for diagnosing a motor-operated valve comprising a valve disc for opening and closing a given passage, a worm rotatably driven by motor power, a link mechanism which opens and closes the valve disc with rotational driving force transmitted from the worm, and a spring cartridge containing disc springs which expand or compress in response to reaction force acting on the worm from the link mechanism, said diagnostic apparatus comprising:

diagnostic means for calibrating a torque curve representing elastic characteristics of the spring cartridge with a spring pressing device mounted on the motor-operated valve, the spring pressing device pressing the disc springs axially within the spring cartridge while measuring a relationship between a pressing force applied to the disc springs and a displacement of the disc springs, said diagnostic device diagnosing the motor-operated valve based on the calibrated torque curve.

21. The motor-operated valve diagnostic apparatus as claimed in claim 20, wherein the valve disc is moveable between a full open position and a full closed position, wherein the elastic characteristics of the spring cartridge shows a hysteresis between when the valve disc moves from the full open position toward the full closed position and when the valve disc moves from the full closed position toward the full open position, wherein the spring pressing device determines the elastic characteristics of the spring cartridge for the valve disc opening movement from the full closed position toward the full open position without the motor-operated valve in operation and the elastic characteristics of the spring cartridge for the valve disc closing movement from the full open position toward the full closed position with the motor-operated valve in operation.

22. The motor-operated valve diagnostic apparatus as claimed in claim 20, wherein the spring pressing device is attached to the motor-operated valve through an adapter substituted for a cover covering the spring cartridge.

23. The motor-operated valve diagnostic apparatus as claimed in claim 21, wherein the spring pressing device is attached to the motor-operated valve through an adapter substituted for a cover covering the spring cartridge.

24. The motor-operated valve diagnostic apparatus as claimed in claim 20, further comprising a worm position sensor for detecting a condition of compression of the spring cartridge, which results from the reaction force, as a worm axial displacement, and a stress sensor for detecting stress acting on the link mechanism or reaction stress generated in an area subjected to the stress acting on the link mechanism, wherein said diagnostic means detects a load corresponding to the preload of the spring cartridge based on the stress detected by the stress sensor when the spring cartridge is under compression, including at least a compression at the time the spring cartridge starts deforming, as detected by the worm position sensor.

25. The motor-operated valve diagnostic apparatus as claimed in claim 24, wherein the spring pressing device is attached to the motor-operated valve exchangeably with the worm position sensor through an adapter substituted for a cover covering the spring cartridge.

26. The motor-operated valve diagnostic apparatus as claimed in claim 25, wherein the worm position sensor comprises a laser sensor which detects the position of an object by irradiating a laser beam onto the object and detecting light reflected therefrom, wherein the object is an axial edge of the spring cartridge which is axially displaced together with said worm or a part connected to the axial edge for movement therewith.

27. The motor-operated valve diagnostic apparatus as claimed in claim 21, further comprising a worm position sensor for detecting a condition of compression of the spring cartridge, which results from the reaction force, as a worm axial displacement, and a stress sensor for detecting stress acting on the link mechanism or reaction stress generated in an area subjected to the stress acting on the link mechanism, wherein said diagnostic means detects a load corresponding to the preload of the spring cartridge based on the stress detected by the stress sensor when the spring cartridge is under compression, including at least a compression condition at the time the spring cartridge starts deforming, as detected by the worm position sensor.

28. The motor-operated valve diagnostic apparatus as claimed in claim 27, wherein the spring pressing device is attached to the motor-operated valve exchangeably with the worm position sensor through an adapter substituted for a cover covering the spring cartridge.

29. The motor-operated valve diagnostic apparatus as claimed in claim 28, wherein the worm position sensor comprises a laser sensor which detects the position of an object by irradiating a laser beam onto the object and detecting light reflected therefrom, wherein the object is an axial edge of the spring cartridge which is axially displaced together with said worm or a part connected to the axial edge for movement therewith.

30. The motor-operated valve diagnostic apparatus as claimed in claim 20, further comprising output means for outputting acceptance criteria relating to the diagnostic results or for the diagnostic data together with the diagnostic results and/or diagnostic data.

31. The motor-operated valve diagnostic apparatus as claimed in claim 11, wherein the worm position sensor comprises a laser sensor which detects the position of an object by irradiating a laser beam onto the object and detecting light reflected therefrom, wherein the object is an axial edge of the spring cartridge which is axially displaced together with said worm or a part connected to the axial edge for movement therewith.

* * * * *